(12) United States Patent
Jiao et al.

(10) Patent No.: US 12,445,262 B2
(45) Date of Patent: Oct. 14, 2025

(54) CONFIGURATION INFORMATION INDICATION METHOD AND APPARATUS

(71) Applicant: HUAWEI TECHNOLOGIES CO., LTD., Shenzhen (CN)

(72) Inventors: Chunxu Jiao, Shanghai (CN); Chao Li, Beijing (CN); Zhengzheng Xiang, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 586 days.

(21) Appl. No.: 17/959,340

(22) Filed: Oct. 4, 2022

(65) Prior Publication Data

US 2023/0042779 A1 Feb. 9, 2023

Related U.S. Application Data

(63) Continuation of application No. PCT/CN2021/085926, filed on Apr. 8, 2021.

(30) Foreign Application Priority Data

Apr. 8, 2020 (CN) .......................... 202010270650.3
May 15, 2020 (CN) .......................... 202010414679.4

(51) Int. Cl.
*H04L 5/14* (2006.01)
*H04L 27/26* (2006.01)
*H04W 56/00* (2009.01)

(52) U.S. Cl.
CPC ...... *H04L 5/1469* (2013.01); *H04L 27/26025* (2021.01); *H04W 56/001* (2013.01)

(58) Field of Classification Search
CPC ........... H04L 5/1469; H04L 27/26025; H04W 56/001
See application file for complete search history.

(56) References Cited

U.S. PATENT DOCUMENTS

2021/0099988 A1* 4/2021 Wu .................... H04L 5/0078
2024/0430915 A1* 12/2024 Zhao .................... H04L 5/003

FOREIGN PATENT DOCUMENTS

CA 3054543 A1 * 8/2018 .......... H04L 5/0053
CN 110402558 A 11/2019
(Continued)

OTHER PUBLICATIONS

Huawei, HiSilicon, Sidelink synchronization mechanisms for NR V2X. 3GPP TSG RAN WGI Meeting #99, Reno, USA, Nov. 18-22, 2019, RI-1911885, 24 pages.
(Continued)

*Primary Examiner* — Saad A. Waqas
(74) *Attorney, Agent, or Firm* — HAUPTMAN HAM, LLP

(57) ABSTRACT

A configuration information indication method and apparatus, applicable to systems such as a vehicle to everything V2X communication system and a vehicle-to-vehicle V2V communication system, to resolve a problem that SL transmission causes interference to DL transmission due to relatively poor indication accuracy of UL transmission time in the conventional technology. The method includes: receiving an uplink-downlink time division duplex TDD configuration from a network device; determining, based on first periodicity information included in the uplink-downlink TDD configuration, a first subcarrier spacing SCS corresponding to the first periodicity information, where the first SCS is used to indicate a sidelink SL reference SCS; and sending indication information to a second terminal device based on the uplink-downlink TDD configuration and the first SCS, where the indication information is used to indicate uplink UL transmission time corresponding to the first periodicity information.

18 Claims, 9 Drawing Sheets

(56) References Cited

FOREIGN PATENT DOCUMENTS

| CN | 110536449 A | 12/2019 |
|---|---|---|
| CN | 110809322 A | 2/2020 |
| WO | 2020065896 A1 | 4/2020 |

OTHER PUBLICATIONS

CATT, Feature lead summary on AI 7.2.4.3 #2 Sidelink synchronization mechanism. 3GPP TSG RAN WG1 Meeting #100, e-Meeting, Feb. 24-Mar. 6, 2020, R1-2000833, 26 pages.
Extended European Search Report issued in corresponding European Application No. 21785488.4, dated Aug. 21, 2023, pp. 1-10.
Huawei et al, "Remaining Details of Sidelink Synchronization Mechanisms", 3GPP TSG RAN WG1 Meeting #100bis-e E-meeting R1-2001553, Apr. 11, 2020, total 16 pages.
3GPP TS 38.213 V16.0.0 (Dec. 2019), 3rd Generation Partnership Project; Technical Specification Group Radio Access Network; NR; Physical layer procedures for control(Release 16), 146 pages.
3GPP TS 38.331 V15.7.0 (Sep. 2019), 3rd Generation Partnership Project; Technical Specification Group Radio Access Network; NR; Radio Resource Control (RRC) protocol specification(Release 15), 527 pages.
3GPP TS 38.101-1 V16.3.0:"3rd Generation Partnership Project; Technical Specification Group Radio Access Network; NR; User Equipment (UE) radio transmission and reception; Part 1: Range 1 Standalone(Release 16)",Mar. 2020, total 332 pages.
3GPP TS 38.211 V16.1.0:"3rd Generation Partnership Project; Technical Specification Group Radio Access Network; NR;Physical channels and modulation(Release 16)",Mar. 2020, total 130 pages.
3GPP TS 38.304 V15.6.0 (Dec. 2019), 3rd Generation Partnership Project; Technical Specification Group Radio Access Network; NR; User Equipment (UE) procedures in Idle mode and RRC Inactive state(Release 15), 30 pages.
3GPP TSG RAN WG1 Meeting #97, R1-1906012, Sidelink synchronization mechanisms for NR V2X,Huawei, HiSilicon, Reno, USA, May 13-17, 2019, total 13 pages.
3GPP TSG RAN WG1 Meeting #100-e,R1-2000185, Remaining details of sidelink synchronization mechanisms, Huawei, HiSilicon, Feb. 24-Mar. 6, 2020, total 14 pages.
International Search Report issued in corresponding International Application No. PCT/CN2021/085926, mailed Jun. 28, 2021, pp. 1-29.

* cited by examiner

Transmit end UE

Receive end UE

CONFIGURATION INFORMATION INDICATION METHOD AND APPARATUS

CROSS-REFERENCE TO RELATED APPLICATIONS

This application is a continuation of International Application No. PCT/CN2021/085926, filed on Apr. 8, 2021, which claims priority to Chinese Patent Application No. 202010270650.3, filed on Apr. 8, 2020 and Chinese Patent Application No. 202010414679.4, filed on May 15, 2020. All of the aforementioned patent applications are hereby incorporated in entirety by reference.

BACKGROUND

In a 5th generation (5th generation, 5G) mobile communication network new radio (new radio, NR) system, a 5G next generation Node B (next generation Node B, gNB) sends an uplink-downlink time division duplex (time division duplex, TDD) configuration on a Uu interface to indicate a time allocation manner of a downlink (downlink, DL) and an uplink (uplink, UL) in a time range to UE. The UE receives DL data from the gNB in DL transmission time, and sends UL data to the gNB in UL transmission time.

Data transmission on a PC5 interface used for communication between UEs and data transmission on the Uu interface is performed at a same carrier frequency. However, sidelink (sidelink, SL) transmission on the PC5 interface is unable to occupy DL transmission time. In the conventional technology, an uplink-downlink TDD configuration is transferred between UEs to indicate UE to perform SL transmission in UL transmission time. However, indicated UL transmission time is usually not accurate enough due to a lack of consideration of a communication status related to SL transmission, and consequently SL transmission causes interference to DL transmission.

SUMMARY

Some embodiments provide a configuration information indication method and apparatus, applicable to the Internet of vehicles, such as vehicle to everything (vehicle to everything, V2X) communication or device-to-device (device to device, D2D) communication, or applicable to the intelligent driving field, the intelligent networked vehicle field, or the like, to resolve a problem that SL transmission causes interference to DL transmission due to relatively poor indication accuracy of UL transmission time in the conventional technology.

Some embodiments provide a configuration information indication method. The method is applied to a first terminal device and includes:
  receiving an uplink-downlink time division duplex TDD configuration from a network device, where the uplink-downlink TDD configuration includes first periodicity information;
  determining, based on the first periodicity information, a first subcarrier spacing SCS corresponding to the first periodicity information, where the first SCS is used to indicate a sidelink SL reference SCS; and
  sending indication information to a second terminal device based on the uplink-downlink TDD configuration and the first SCS, where the indication information is used to indicate uplink UL transmission time corresponding to the first periodicity information.

In some embodiments, the first terminal device determines corresponding SL reference SCSs for different period information, for example, determines the first SCS corresponding to the first periodicity information for the first periodicity information; and then pertinently indicates UL transmission time corresponding to period information included in the uplink-downlink TDD configuration to the second terminal device based on the SL reference SCSs corresponding to the different periods and the uplink-downlink TDD configuration, so that the second terminal device accurately performs SL transmission based on the indicated UL transmission time in period time corresponding to the period information, thereby avoiding interference to DL transmission.

In some embodiments, the first periodicity information includes period time of a first TDD pattern and period time of a second TDD pattern.

In some embodiments, the UL transmission time corresponding to the first periodicity information includes a UL slot quantity corresponding to the period time of the first TDD pattern and a UL slot quantity corresponding to the period time of the second TDD pattern.

In some embodiments, the indication information includes a first bit sequence, and the first bit sequence is used to indicate the UL slot quantity corresponding to the period time of the first TDD pattern and the UL slot quantity corresponding to the period time of the second TDD pattern; and the method further includes:
  determining the first bit sequence based on an indication parameter, where the indication parameter includes at least one of the following: the period time of the first TDD pattern, the period time of the second TDD pattern, the UL slot quantity corresponding to the period time of the first TDD pattern, the UL slot quantity corresponding to the period time of the second TDD pattern, and the first SCS.

In some embodiments, the determining the first bit sequence based on an indication parameter includes:
  determining an uplink slot indicator USI according to the following function relationship formula:

$USI = u_1 \times (P_2 \times 2^{\mu_{ref}^{SL}} + 1) + u_2$, wherein:

$u_1$ represents the UL slot quantity corresponding to the period time of the first TDD pattern, $P_2$ represents the period time of the second TDD pattern, $u_2$ represents the UL slot quantity corresponding to the period time of the second TDD pattern, and $2^{\mu_{ref}^{SL}}$ is a coefficient determined based on the first SCS; and
  determining the first bit sequence based on the USI, where the first bit sequence is a binary representation of the USI.

In some embodiments, the uplink slot indicator USI is determined by using the function relationship formula that represents a relationship between related parameters included in the indication parameter, and then the first bit sequence is determined based on the USI, to implement a joint indication of the UL slot quantities corresponding to the period time of the two TDD patterns, thereby ensuring that the UL slot quantities corresponding to the period time of the two TDD patterns are completely and accurately indicated by using a limited quantity of bits. This is relatively flexible.

In some embodiments, the determining a first subcarrier spacing SCS corresponding to the first periodicity information includes:

determining, based on a mapping relationship between the first periodicity information and the first SCS, the first SCS corresponding to the first periodicity information.

In some embodiments, SL reference SCSs having mapping relationships with different period information are set for the different period information, for example, the first SCS is set for the first periodicity information. In period time corresponding to the different period information, the terminal device pertinently determines, based on the SL reference SCSs corresponding to the different period information, UL transmission time that is occupied to perform SL transmission, so that SL transmission between the terminal devices is more flexible.

In some embodiments, the determining a first subcarrier spacing SCS corresponding to the first periodicity information includes:
  determining a first set based on a second SCS and the period time of the first TDD pattern, where the first set is used to indicate a value range of the UL slot quantity corresponding to the period time of the first TDD pattern;
  determining a second set based on the second SCS and the period time of the second TDD pattern, where the second set is used to indicate a value range of the UL slot quantity corresponding to the period time of the second TDD pattern; and
  in response to determining that a quantity of elements included in a third set is less than or equal to a first threshold, determining the second SCS as the first SCS, where the third set is determined based on a direct product of the first set and the second set, and the first threshold is determined based on a quantity of bits of the first bit sequence.

In some embodiments, SL reference SCSs corresponding to different period information are configured based on consideration of the limited quantity of bits of the first bit sequence, namely, a limited quantity of values that are represented by the first bit sequence, to ensure that the first bit sequence indicates UL slot quantities of all possible values corresponding to the different period information, thereby ensuring that the terminal device that receives the indication information accurately determines occupiable UL transmission time in period time corresponding to the different period information, to perform SL transmission. Therefore, interference to DL transmission is avoided.

In some embodiments, the method further includes: determining, based on a ratio of the first SCS to a reference SCS included in the uplink-downlink TDD configuration, the UL slot quantity corresponding to the period time of the first TDD pattern and the UL slot quantity corresponding to the period time of the second TDD pattern.

In some embodiments, a UL slot quantity corresponding to period time of a related TDD pattern is determined based on the reference SCS for SL transmission and the reference SCS in the uplink-downlink TDD configuration, instead of directly sending reference data such as a reference UL slot quantity in the uplink-downlink TDD configuration to the second terminal device. This is more flexibly applicable to SL communication between the terminal devices.

In some embodiments, the indication information is further used to indicate the first periodicity information.

In some embodiments, the first periodicity information further includes a TDD pattern quantity, and the TDD pattern quantity is 2; and the indication information includes a second bit sequence, a first part of bits in the second bit sequence are used to indicate the TDD pattern quantity, and a second part of bits in the second bit sequence are used to indicate the period time of the first TDD pattern and the period time of the second TDD pattern.

In some embodiments, the indication information is carried in a physical sidelink broadcast channel PSBCH of a sidelink synchronization signal block S-SSB.

Some embodiments provide a configuration information indication method. The method is applied to a second terminal device and includes:
  receiving indication information from a first terminal device, where the indication information is used to indicate uplink UL transmission time corresponding to first periodicity information; and
  determining, based on the indication information, the UL transmission time corresponding to the first periodicity information.

In some embodiments, the second terminal device receives the indication information from the first terminal device, and determines the UL transmission time that corresponds to the first periodicity information and that is indicated by the indication information. The second terminal device performs SL transmission with another terminal device based on the UL transmission time corresponding to the first periodicity information in period time corresponding to the first periodicity information, to prevent SL transmission performed between the terminal devices from causing interference to DL transmission performed between a network device and the terminal device.

In some embodiments, the first periodicity information is period information included in an uplink-downlink time division duplex TDD configuration received by the first terminal device, and the first periodicity information includes period time of a first TDD pattern and period time of a second TDD pattern.

In some embodiments, the UL transmission time corresponding to the first periodicity information includes a UL slot quantity corresponding to the period time of the first TDD pattern and a UL slot quantity corresponding to the period time of the second TDD pattern.

In some embodiments, the indication information includes a first bit sequence, and the first bit sequence is used to indicate the UL slot quantity corresponding to the period time of the first TDD pattern and the UL slot quantity corresponding to the period time of the second TDD pattern; and
  the determining, based on the indication information, the UL transmission time corresponding to the first periodicity information includes:
  determining, by parsing the first bit sequence, the UL slot quantity corresponding to the period time of the first TDD pattern and the UL slot quantity corresponding to the period time of the second TDD pattern.

In some embodiments, the first bit sequence is determined based on an indication parameter, where the indication parameter includes at least one of the following: the period time of the first TDD pattern, the period time of the second TDD pattern, the UL slot quantity corresponding to the period time of the first TDD pattern, the UL slot quantity corresponding to the period time of the second TDD pattern, and a first subcarrier spacing SCS corresponding to the first periodicity information, where the first SCS is used to indicate a sidelink SL reference SCS.

In some embodiments, the first bit sequence is determined based on an uplink slot indicator USI, and the first bit sequence is a binary representation of the USI; and the USI is determined according to the following function relationship formula:

$$USI = u_1 \times (P_2 \times 2^{\mu_{ref}^{SL}} + 1) + u_2, \text{ wherein:}$$

$u_1$ represents the UL slot quantity corresponding to the period time of the first TDD pattern, $P_2$ represents the period time of the second TDD pattern, $u_2$ represents the UL slot quantity corresponding to the period time of the second TDD pattern, and $2^{\mu_{ref}^{SL}}$ is a coefficient determined based on the first SCS.

In some embodiments, the uplink slot indicator USI is determined by using the function relationship formula that represents a relationship between related parameters included in the indication parameter, and the first bit sequence is set to the binary representation of the USI, that is, the UL slot quantities corresponding to the period time of the two TDD patterns are jointly indicated. This is relatively flexible. Therefore, the second terminal device completely and accurately determines, by parsing the first bit sequence, the UL slot quantities corresponding to the period time of the two TDD patterns.

In some embodiments, the determining the UL slot quantity corresponding to the period time of the first TDD pattern and the UL slot quantity corresponding to the period time of the second TDD pattern includes:
  determining the first SCS and the period time of the second TDD pattern; and
  determining, based on the USI corresponding to the first bit sequence, the first SCS, and the period time of the second TDD pattern by using the function relationship formula, the UL slot quantity corresponding to the period time of the first TDD pattern and the UL slot quantity corresponding to the period time of the second TDD pattern.

In some embodiments, the indication information is further used to indicate the first periodicity information; and
  the determining the period time of the second TDD pattern includes:
  determining the period time of the second TDD pattern based on the indication information.

In some embodiments, the first periodicity information further includes a TDD pattern quantity, and the TDD pattern quantity is 2; and the indication information includes a second bit sequence, a first part of bits in the second bit sequence are used to indicate the TDD pattern quantity, and a second part of bits in the second bit sequence are used to indicate the period time of the first TDD pattern and the period time of the second TDD pattern; and
  the determining the period time of the second TDD pattern based on the indication information includes:
  determining the period time of the second TDD pattern based on the second part of bits in the second bit sequence.

In some embodiments, the indication information is indicated by using a limited quantity of bits of the first bit sequence and/or a limited quantity of bits of the second bit sequence, thereby facilitating parsing. Therefore, signaling overheads for communication between the terminal devices are reduced.

In some embodiments, the determining the first SCS includes:
  determining the first SCS based on a mapping relationship between the first periodicity information and the first SCS.

In some embodiments, SL reference SCSs having mapping relationships with different period information are set for the different period information, for example, the first SCS is set for the first periodicity information. In period time corresponding to the different period information, the terminal device pertinently determines, based on the SL reference SCSs corresponding to the different period information, UL transmission time that is occupied to perform SL transmission, so that SL transmission between the terminal devices is more flexible.

In some embodiments, the determining the first SCS includes:
  determining a first set based on a second SCS and the period time of the first TDD pattern, where the first set is used to indicate a value range of the UL slot quantity corresponding to the period time of the first TDD pattern;
  determining a second set based on the second SCS and the period time of the second TDD pattern, where the second set is used to indicate a value range of the UL slot quantity corresponding to the period time of the second TDD pattern; and
  in response to determining that a quantity of elements included in a third set is less than or equal to a first threshold, determining the second SCS as the first SCS, where the third set is determined based on a direct product of the first set and the second set, and the first threshold is determined based on a quantity of bits of the first bit sequence.

In some embodiments, SL reference SCSs corresponding to different period information are configured based on consideration of a limited quantity of bits of the first bit sequence, namely, a limited quantity of values that are represented by the first bit sequence, to ensure that the first bit sequence indicates UL slot quantities of possible values corresponding to the different period information. The second terminal device that receives the indication information determines, based on the quantity of bits of the first bit sequence, an SL reference SCS corresponding to related period information, and then accurately determine occupiable UL transmission time in period time corresponding to the period information, to perform SL transmission. Therefore, interference to DL transmission is avoided.

Some embodiments provide a configuration information indication apparatus, including:
  a receiving module, configured to receive an uplink-downlink time division duplex TDD configuration from a network device, where the uplink-downlink TDD configuration includes first periodicity information;
  a processing module, configured to determine, based on the first periodicity information, a first subcarrier spacing SCS corresponding to the first periodicity information, where the first SCS is used to indicate a sidelink SL reference SCS; and
  a sending module, configured to send indication information to a second terminal device based on the uplink-downlink TDD configuration and/or the first SCS, where the indication information is used to indicate uplink UL transmission time corresponding to the first periodicity information.

In some embodiments, a first terminal device determines corresponding SL reference SCSs for different period information, for example, determines the first SCS corresponding to the first periodicity information for the first periodicity information; and then pertinently indicates UL transmission time corresponding to period information included in the uplink-downlink TDD configuration to the second terminal device based on the SL reference SCSs corresponding to the different periods and the uplink-downlink TDD configuration, so that the second terminal device accurately performs SL transmission based on the indicated UL transmission time in period time corresponding to the period information, thereby avoiding interference to DL transmission.

In some embodiments, the first periodicity information includes period time of a first TDD pattern and period time of a second TDD pattern.

In some embodiments, the UL transmission time corresponding to the first periodicity information includes a UL slot quantity corresponding to the period time of the first TDD pattern and a UL slot quantity corresponding to the period time of the second TDD pattern.

In some embodiments, the indication information includes a first bit sequence, and the first bit sequence is used to indicate the UL slot quantity corresponding to the period time of the first TDD pattern and the UL slot quantity corresponding to the period time of the second TDD pattern; and the processing module is further configured to determine the first bit sequence based on an indication parameter, where the indication parameter includes at least one of the following: the period time of the first TDD pattern, the period time of the second TDD pattern, the UL slot quantity corresponding to the period time of the first TDD pattern, the UL slot quantity corresponding to the period time of the second TDD pattern, and the first SCS.

In some embodiments, the processing module is further configured to:
determine an uplink slot indicator USI according to the following function relationship formula:

$$USI = u_1 \times (P_2 \times 2^{\mu_{ref}^{SL}} + 1) + u_2, \text{ wherein:}$$

$u_1$ represents the UL slot quantity corresponding to the period time of the first TDD pattern, $P_2$ represents the period time of the second TDD pattern, $u_2$ represents the UL slot quantity corresponding to the period time of the second TDD pattern, and $2^{\mu_{ref}^{SL}}$ is a coefficient determined based on the first SCS; and determine the first bit sequence based on the USI, where the first bit sequence is a binary representation of the USI.

In some embodiments, the uplink slot indicator USI is determined by using the function relationship formula that represents a relationship between related parameters included in the indication parameter, and then the first bit sequence is determined based on the USI, to implement a joint indication of the UL slot quantities corresponding to the period time of the two TDD patterns, thereby ensuring that the UL slot quantities corresponding to the period time of the two TDD patterns are completely and accurately indicated by using a limited quantity of bits. This is relatively flexible.

In some embodiments, the processing module is further configured to:
determine, based on a mapping relationship between the first periodicity information and the first SCS, the first SCS corresponding to the first periodicity information.

In some embodiments, SL reference SCSs having mapping relationships with different period information are set for the different period information, for example, the first SCS is set for the first periodicity information. In period time corresponding to the different period information, the terminal device pertinently determines, based on the SL reference SCSs corresponding to the different period information, UL transmission time that is occupied to perform SL transmission, so that SL transmission between the terminal devices is more flexible.

In some embodiments, the processing module is further configured to:
determine a first set based on a second SCS and the period time of the first TDD pattern, where the first set is used to indicate a value range of the UL slot quantity corresponding to the period time of the first TDD pattern;
determine a second set based on the second SCS and the period time of the second TDD pattern, where the second set is used to indicate a value range of the UL slot quantity corresponding to the period time of the second TDD pattern; and
in response to determining that a quantity of elements included in a third set is less than or equal to a first threshold, determine the second SCS as the first SCS, where the third set is determined based on a direct product of the first set and the second set, and the first threshold is determined based on a quantity of bits of the first bit sequence.

In some embodiments, SL reference SCSs corresponding to different period information are configured based on consideration of a limited quantity of bits of the first bit sequence, namely, a limited quantity of values that are represented by the first bit sequence, to ensure that the first bit sequence indicates UL slot quantities of possible values corresponding to the different period information, thereby ensuring that the terminal device that receives the indication information accurately determines occupiable UL transmission time in period time corresponding to the different period information, to perform SL transmission. Therefore, interference to DL transmission is avoided.

In some embodiments, the processing module is further configured to:
determine, based on a ratio of the first SCS to a reference SCS included in the uplink-downlink TDD configuration, the UL slot quantity corresponding to the period time of the first TDD pattern and the UL slot quantity corresponding to the period time of the second TDD pattern.

In some embodiments, a UL slot quantity corresponding to period time of a related TDD pattern is determined based on the reference SCS for SL transmission and the reference SCS in the uplink-downlink TDD configuration, instead of directly sending reference data such as a reference UL slot quantity in the uplink-downlink TDD configuration to the second terminal device. This is more flexibly applicable to SL communication between the terminal devices.

In some embodiments, the indication information is further used to indicate the first periodicity information.

In some embodiments, the first periodicity information further includes a TDD pattern quantity, and the TDD pattern quantity is 2; and the indication information includes a second bit sequence, a first part of bits in the second bit sequence are used to indicate the TDD pattern quantity, and a second part of bits in the second bit sequence are used to indicate the period time of the first TDD pattern and the period time of the second TDD pattern.

In some embodiments, the indication information is carried in a physical sidelink broadcast channel PSBCH of a sidelink synchronization signal block S-SSB.

Some embodiments provide a configuration information indication apparatus, including:
a receiving module, configured to receive indication information from a first terminal device, where the indication information is used to indicate uplink UL transmission time corresponding to first periodicity information; and a processing module, configured to determine, based on the indication information, the UL transmission time corresponding to the first periodicity information.

In some embodiments, a second terminal device receives the indication information from the first terminal device, and determines the UL transmission time that corresponds to the first periodicity information and that is indicated by the indication information. The second terminal device performs SL transmission with another terminal device based on the UL transmission time corresponding to the first periodicity information in period time corresponding to the first periodicity information, to prevent SL transmission performed between the terminal devices from causing interference to DL transmission performed between a network device and the terminal device.

In some embodiments, the first periodicity information is period information included in an uplink-downlink time division duplex TDD configuration received by the first terminal device, and the first periodicity information includes period time of a first TDD pattern and period time of a second TDD pattern.

In some embodiments, the UL transmission time corresponding to the first periodicity information includes a UL slot quantity corresponding to the period time of the first TDD pattern and a UL slot quantity corresponding to the period time of the second TDD pattern.

In some embodiments, the indication information includes a first bit sequence, and the first bit sequence is used to indicate the UL slot quantity corresponding to the period time of the first TDD pattern and the UL slot quantity corresponding to the period time of the second TDD pattern; and
the processing module is further configured to determine, by parsing the first bit sequence, the UL slot quantity corresponding to the period time of the first TDD pattern and the UL slot quantity corresponding to the period time of the second TDD pattern.

In some embodiments, the first bit sequence is determined based on an indication parameter, where the indication parameter includes at least one of the following: the period time of the first TDD pattern, the period time of the second TDD pattern, the UL slot quantity corresponding to the period time of the first TDD pattern, the UL slot quantity corresponding to the period time of the second TDD pattern, and a first subcarrier spacing SCS corresponding to the first periodicity information, where the first SCS is used to indicate a sidelink SL reference SCS.

In some embodiments, the first bit sequence is determined based on an uplink slot indicator USI, and the first bit sequence is a binary representation of the USI; and the USI is determined according to the following function relationship formula:

$$USI = u_1 \times (P_2 \times 2^{\mu_{ref}^{SL}} + 1) + u_2,$$ wherein:

$u_1$ represents the UL slot quantity corresponding to the period time of the first TDD pattern, $P_2$ represents the period time of the second TDD pattern, $u_2$ represents the UL slot quantity corresponding to the period time of the second TDD pattern, and $2^{\mu_{ref}^{SL}}$ is a coefficient determined based on the first SCS.

In some embodiments, the uplink slot indicator USI is determined by using the function relationship formula that represents a relationship between related parameters included in the indication parameter, and the first bit sequence is set to the binary representation of the USI, that is, the UL slot quantities corresponding to the period time of the two TDD patterns are jointly indicated. This is relatively flexible. Therefore, the second terminal device accurately determines, by parsing the first bit sequence, the UL slot quantities corresponding to the period time of the two TDD patterns.

In some embodiments, the processing module is further configured to:
determine the first SCS and the period time of the second TDD pattern; and
determine, based on the USI corresponding to the first bit sequence, the first SCS, and the period time of the second TDD pattern by using the function relationship formula, the UL slot quantity corresponding to the period time of the first TDD pattern and the UL slot quantity corresponding to the period time of the second TDD pattern.

In some embodiments, the indication information is further used to indicate the first periodicity information; and
the processing module is further configured to determine the period time of the second TDD pattern based on the indication information.

In some embodiments, the first periodicity information further includes a TDD pattern quantity, and the TDD pattern quantity is 2; and the indication information includes a second bit sequence, a first part of bits in the second bit sequence are used to indicate the TDD pattern quantity, and a second part of bits in the second bit sequence are used to indicate the period time of the first TDD pattern and the period time of the second TDD pattern; and
the processing module is further configured to determine the period time of the second TDD pattern based on the second part of bits in the second bit sequence.

In some embodiments, the indication information is indicated by using a limited quantity of bits of the first bit sequence and/or a limited quantity of bits of the second bit sequence, thereby facilitating parsing. Therefore, signaling overheads for communication between the terminal devices are reduced.

In some embodiments, the processing module is further configured to determine the first SCS based on a mapping relationship between the first periodicity information and the first SCS.

In some embodiments, SL reference SCSs having mapping relationships with different period information are set for the different period information, for example, the first SCS is set for the first periodicity information. In period time corresponding to the different period information, the terminal device pertinently determines, based on the SL reference SCSs corresponding to the different period information, UL transmission time that is occupied to perform SL transmission, so that SL transmission between the terminal devices is more flexible.

In some embodiments, the processing module is further configured to:
determine a first set based on a second SCS and the period time of the first TDD pattern, where the first set is used to indicate a value range of the UL slot quantity corresponding to the period time of the first TDD pattern;
determine a second set based on the second SCS and the period time of the second TDD pattern, where the second set is used to indicate a value range of the UL slot quantity corresponding to the period time of the second TDD pattern; and
in response to determining that a quantity of elements included in a third set is less than or equal to a first threshold, determine the second SCS as the first SCS, where the third set is determined based on a direct product of the first set and the second set, and the first threshold is determined based on a quantity of bits of the first bit sequence.

In some embodiments, SL reference SCSs corresponding to different period information are configured based on consideration of a limited quantity of bits of the first bit sequence, namely, a limited quantity of values that are represented by the first bit sequence, to ensure that the first bit sequence indicates UL slot quantities of possible values corresponding to the different period information. The second terminal device that receives the indication information determines, based on the quantity of bits of the first bit sequence, an SL reference SCS corresponding to related period information, and then accurately determine occupiable UL transmission time in period time corresponding to the period information, to perform SL transmission. Therefore, interference to DL transmission is avoided.

Some embodiments provide a communication apparatus, including a processor and a memory. The memory stores a computer program. The processor executes the computer program stored in the memory, to enable the communication apparatus to perform the method in the embodiments.

Some embodiments provide a communication apparatus, including a processor and an interface circuit.

The interface circuit is configured to receive code instructions and transmit the code instructions to the processor.

The processor is configured to run the code instructions to perform the method in the embodiments.

Some embodiments provide a readable storage medium. The readable storage medium stores instructions. In response to the instructions being executed, the method in the embodiments is implemented.

Some embodiments provide a computer program product. The computer program product includes computer program code. In response to the computer program code being run by a processor of a communication apparatus, the communication apparatus is enabled to perform the method in the embodiments.

Some embodiments provide a communication system, including the configuration information indication apparatus in the embodiments.

DESCRIPTION OF EMBODIMENTS

Figure 1A:
FIG. 1a is a schematic diagram of time allocation in accordance with some embodiments.

To make objectives, technical solutions, and advantages of the embodiments clearer, the following further describes the embodiments in detail with reference to the accompanying drawings. The described embodiments are some rather than all the embodiments. Other embodiments obtained by a person of ordinary skill in the art based on the embodiments without creative efforts shall fall within the protection scope of the embodiments.

The term "and/or" in the embodiments describes an association relationship between associated objects and represents that three relationships exists. For example, A and/or B represents the following three cases: A exists, both A and B exist, and B exists. The character "/" usually indicates an "or" relationship between associated objects. The term "a plurality of" indicates "two or more". In addition, in the descriptions of the embodiments, the words such as "first" and "second" are used for a purpose of distinguishing between descriptions, but is unable to be understood as an indication or implication of relative importance, or an indication or implication of a sequence.

To facilitate understanding of a person skilled in the art, some of the terms provided in the embodiments are first explained as follows:

(1) Network Device

The network device is a base station or an access node (access node, AN), and provides a wireless access service for a terminal. The network device is a base transceiver station (base transceiver station, BTS) in a global system for mobile communications (global system for mobile communication, GSM) or a code division multiple access (code division multiple access, CDMA) system, or is a NodeB (NodeB) in a wideband code division multiple access (wideband code division multiple access, WCDMA) system, or a next generation Node B (gNB) in a 5G network, a small cell device, a Wi-Fi access point (Wi-Fi AP), a worldwide interoperability for microwave access base station (worldwide interoperability for microwave access base station, WiMAX BS), or the like. This is not limited in the embodiments.

(2) Terminal Device

The terminal device is also referred to as a terminal, user equipment (user equipment, UE), a mobile station (mobile station, MS), a mobile terminal (mobile terminal, MT), or the like, is a device that provides voice and/or data connectivity for a user, for example, a handheld device, a vehicle-mounted device, a wearable device, or a computing device that has a wireless connection function, another processing device connected to a wireless modem, or user equipment in various forms. The terminal device includes but is not limited to a station (English: station, STA for short), a mobile station (mobile station, MS), a subscriber unit (subscriber unit, SU), a personal computer (English: personal computer, PC for short), a laptop computer (laptop computer, LC), a tablet computer (English: tablet computer, TC for short), a netbook (netbook), a terminal (terminal), a personal digital assistant (English: personal digital assistant, PDA for short), a mobile Wi-Fi hotspot device (mifi device), a smartwatch, smart glasses, or the like. Terminal devices are distributed in an entire network. For ease of description, the terminal device is a terminal device or UE for short in the embodiments.

(3) Time Division Duplex and Uplink-Downlink Time Division Duplex Configuration

Time division duplex (time division duplex, TDD) is a duplex mode widely used in wireless communication. Based on this, downlink (downlink, DL) transmission and uplink (uplink, UL) transmission on a communication interface, namely, a Uu interface (Uu interface), used for communication between a network device and a terminal device is performed at a same carrier frequency in a time division manner.

Figure 1B:
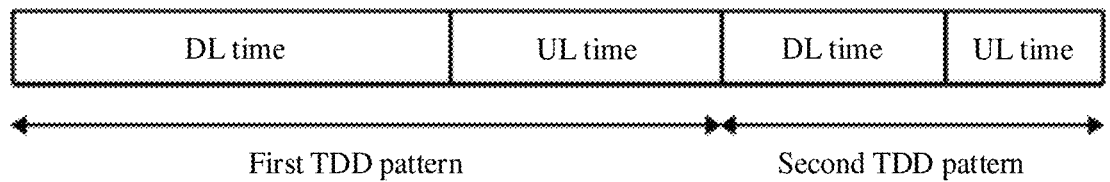
FIG. 1b is another schematic diagram of time allocation in accordance with some embodiments.

To implement low-latency transmission, in particular, adaptation to an ultra-low-latency demand of an ultra-reliable and low latency communications (ultra-reliable low-latency communication, URLLC) service, a 5G next generation Node B (next generation Node B, gNB) sends an uplink-downlink TDD configuration on a Uu interface to UE by using radio resource control (Radio Resource Control, RRC) signaling, to indicate a time allocation manner of a DL and a UL in one or more time ranges to the UE. FIG. 1a is a schematic diagram of time allocation. FIG. 1a shows a time allocation manner of a DL and a UL in a case in which an uplink-downlink TDD configuration includes one TDD pattern (pattern). FIG. 1b is another schematic diagram of time allocation. FIG. 1b shows a time allocation manner of a DL and a UL in a case in which an uplink-downlink TDD configuration includes two TDD patterns (pattern), for example, a first TDD pattern and a second TDD pattern. The UE performs frequent uplink-downlink handover based on the uplink-downlink TDD configuration; and receives DL data from the gNB in DL time corresponding to one or more TDD patterns, and sends UL data to the gNB in UL time corresponding to the one or more TDD patterns.

Uplink-downlink TDD configurations are classified into a cell-level uplink-downlink TDD configuration and a UE-level uplink-downlink TDD configuration. The cell-level uplink-downlink TDD configuration is applicable to UE in a gNB coverage area; and indicates a DL slot quantity and a UL slot quantity in terms of a slot (slot) granularity, and indicates a DL symbol quantity and a UL symbol quantity in terms of an orthogonal frequency division multiplexing (orthogonal frequency division multiplexing, OFDM) symbol granularity. The UE-level uplink-downlink TDD configuration is applicable to UE in a gNB coverage area. For the UE-level uplink-downlink TDD configuration, a configurable slot is further introduced based on the cell-level uplink-downlink TDD configuration, that is, a configurable slot represented by F is further introduced in addition to a DL slot represented by D and a UL slot represented by U. An OFDM symbol is used as a granularity in an uplink-downlink TDD configuration in the configurable slot, that is, different symbols in a same slot is in different uplink/downlink states. OFDM symbols in the configurable slot is configured as UL symbols or DL symbols.

A gNB sends a corresponding uplink-downlink TDD configuration to UE by using radio resource control (radio resource control, RRC) signaling. The gNB performs indication for UE in a gNB coverage area or in a cell by using a TDD-UL-DL-ConfigCommon information element in the RRC signaling. For example, indication content of a TDD-UL-DL-ConfigCommon information element in the 3GPP 38.331 V15.7.0 standard is as follows:

```
TDD-UL-DL-ConfigCommon::= SEQUENCE{
    referenceSubcarrierSpacing SubcarrierSpacing,
    pattern1        TDD-UL-DL-Pattern,
    pattern2        TDD-UL-DL-Pattern OPTIONAL, --Need R
    ...
}
```

The TDD-UL-DL-ConfigCommon information element further includes two information elements or three information elements. The information elements are explained as follows:

① referenceSubcarrierSpacing: providing a reference subcarrier spacing (subcarrier spacing, SCS): 15 kHz·$2^{\mu_{ref}}$, where a value is one of the following: 15 kHz, 30 kHz, 60 kHz, 120 kHz, and 240 kHz. In the uplink-downlink TDD configuration, a time boundary between DL transmission and UL transmission is determined by using the reference SCS. The reference SCS is different from an SCS used for data transmission on a Uu interface. The reference SCS is unable to be greater than an SCS used for any data transmission configured on the Uu interface.

② pattern1: providing a TDD pattern (pattern) in the uplink-downlink TDD configuration, where pattern1 continues to point to a TDD-UL-DL-Pattern information element, and the TDD-UL-DL-Pattern information element provides a parameter of pattern1.

③ pattern2: an optional IE. In response to the TDD-UL-DL-ConfigCommon information element not including the information element, there is one TDD pattern, namely, pattern1, in the uplink-downlink TDD configuration; or in response to the TDD-UL-DL-ConfigCommon information element including the information element pattern2, the uplink-downlink TDD configuration is jointly determined by using two TDD patterns, namely, pattern1 and pattern2, where pattern2 continues to point to a TDD-UL-DL-Pattern information element, and the TDD-UL-DL-Pattern information element provides a parameter of pattern2.

Both pattern1 and pattern2 continue to point to the TDD-UL-DL-Pattern information elements. For example, indication content of a TDD-UL-DL-Pattern information element in the 3GPP 38.331 V15.7.0 standard is as follows:

```
TDD-UL-DL-Pattern::=          SEQUENCE{
    dl-UL-TransmissionPeriodicity    ENUMERATED{ms0p5, ms0p625, ms1, ms1p25, ms2, ms2p5, ms5, ms10},
    nrofDownlinkSlots                INTEGER (0..maxNrofSlots),
    nrofDownlinkSymbols              INTEGER (0..maxNrofSymbols-1),
```

-continued

```
nrofDownlinkSlots           INTEGER (0..maxNrofSlots),
nrofUplinkSymbols           INTEGER (0..maxNrofSymbols-1),
....,
[[
dl-UL-TransmissionPeriodicity-v1530    ENUMERATED {ms3,ms4} OPTIONAL, -
-Need R
]]
}
```

The TDD-UL-DL-Pattern information element further includes five information elements or six information elements. The information elements are explained as follows:

① dl-UL-TransmissionPeriodicity: represented as P ms, and used to indicate period time of a pattern in the uplink-downlink TDD configuration, where a value is one of the following: 0.5 ms, 0.625 ms, 1 ms, 1.25 ms, 2 ms, 2.5 ms, 5 ms, and 10 ms. However, in response to a dl-UL-TransmissionPeriodicity-v1530 information element being additionally configured in the TDD-UL-DL-Pattern information element, the UE ignores the indication content in the dl-UL-TransmissionPeriodicity information element.

② nrofDownlinkSlots: represented as $d_{slots}$, and used to indicate a DL slot quantity of a TDD pattern in the uplink-downlink TDD configuration, where a value range is an integer from 0 to 320.

③ nrofDownlinkSymbols: represented as $d_{sym}$, and used to indicate a DL symbol quantity of a TDD pattern in the uplink-downlink TDD configuration, where a value range is an integer from 0 to 13.

④ nrofUplinkSlots: represented as $u_{slots}$, and used to indicate a UL slot quantity of a TDD pattern in the uplink-downlink TDD configuration, where a value range is an integer from 0 to 320.

⑤ nrofUplinkSymbols: represented as $u_{sym}$, and used to indicate a UL symbol quantity of a TDD pattern in the uplink-downlink TDD configuration, where a value range is an integer from 0 to 13.

⑥ dl-UL-TransmissionPeriodicity-v1530: an optional information element, where a value range is one of the following: 3 ms and 4 ms. In response to the TDD-UL-DL-Pattern information element not including the dl-UL-TransmissionPeriodicity-v1530 information element, the UE determines period time of a pattern in the uplink-downlink TDD configuration by using the dl-UL-TransmissionPeriodicity information element; or in response to the TDD-UL-DL-Pattern information element including the dl-UL-TransmissionPeriodicity-v1530 information element, the UE ignores the content in the dl-UL-TransmissionPeriodicity information element, and determines period time of a TDD pattern in the uplink-downlink TDD configuration by using the dl-UL-TransmissionPeriodicity-v1530 information element.

Figure 2:
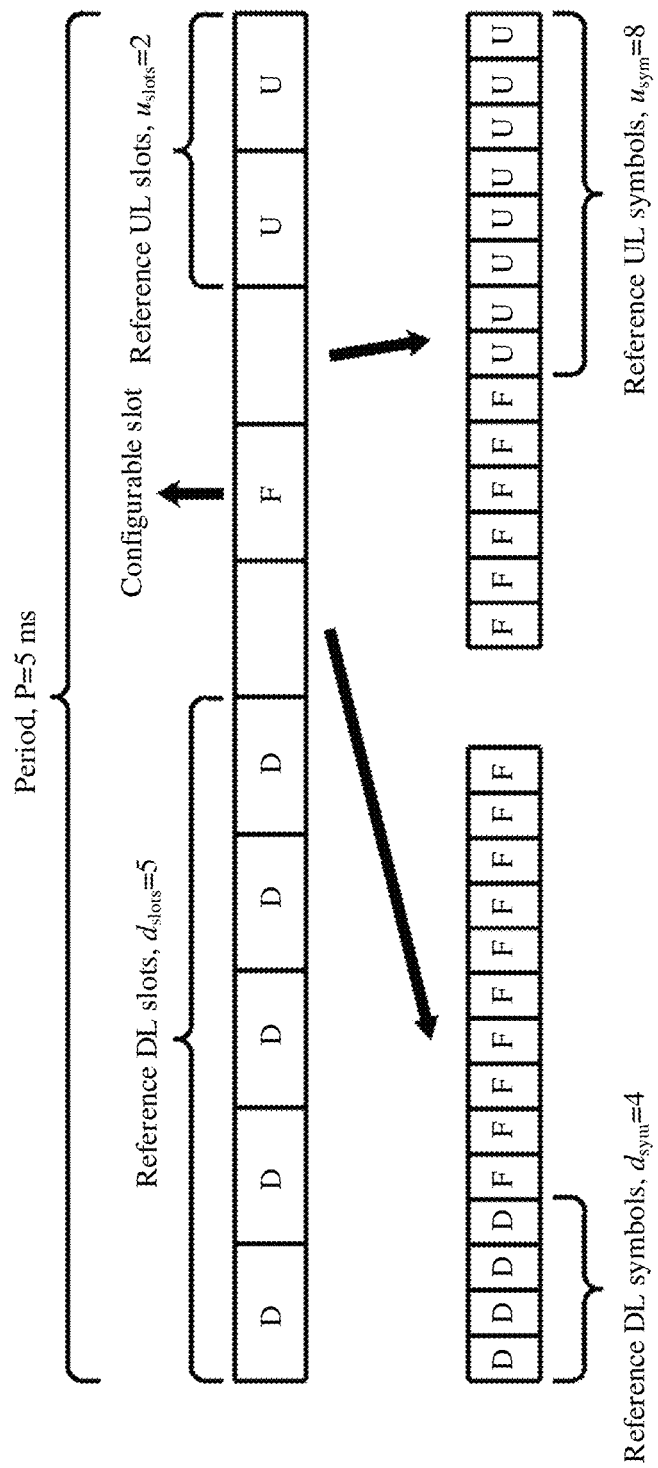
FIG. 2 is a schematic diagram of an uplink-downlink TDD configuration in accordance with some embodiments.

According to a slot configuration period (slot configuration period) specification provided in the 3GPP 38.213 V16.0.0 standard, usage of the foregoing parameters P, $d_{slots}$, $d_{sym}$, $u_{slots}$, and $u_{sym}$ is as follows: in a TDD pattern included in the uplink-downlink TDD configuration, based on the reference SCS (15 kHz·$2^{\mu_{ref}}$), the slot configuration period P ms includes $S=P \cdot 2^{\mu_{ref}}$ reference slots. In the S reference slots, former $d_{slots}$ slots are reference DL slots, and later $u_{slots}$ slots are reference UL slots. $d_{sym}$ symbols after the former $d_{slots}$ slots are reference DL symbols, $u_{sym}$ symbols before the later $u_{slots}$ slots are reference UL symbols, and remaining $(S-d_{slots}-u_{slots}) \cdot N_{symb}^{slot} - d_{sym} - u_{sym}$ symbols are configurable symbols. $N_{symb}^{slot}$ represents a quantity of OFDM symbols in one slot. In response to a normal cyclic prefix (normal cyclic prefix, NCP) being used, $N_{symb}^{slot}=14$. In response to an extended cyclic prefix (extended cyclic prefix, ECP) being used, $N_{symb}^{slot}=12$. For ease of understanding, with reference to FIG. 2, an embodiment provides a schematic diagram of an uplink-downlink TDD configuration. In FIG. 2, a period of a TDD pattern in the uplink-downlink TDD configuration and a time allocation manner in the period are shown, as follows: A reference SCS indicated in a TDD-UL-DL-ConfigCommon information element is 30 kHz, a pattern1 information element is included, and parameter values in a TDD-UL-DL-Pattern information element corresponding to pattern1 are P=5 ms $d_{slots}=5$, $d_{sym}=4$, $u_{slots}=2$, and $u_{sym}=8$.

In addition, in response to the TDD-UL-DL-ConfigCommon information element including both pattern1 and pattern2, a total period of the uplink-downlink TDD configuration is a sum of two periods, namely, $(P+P_2)$ ms, where $P_2$ represents a period indicated in a TDD-UL-DL-Pattern information element corresponding to pattern2. In the total period, an uplink-downlink TDD configuration corresponding to pattern1 is used in former P ms, and an uplink-downlink TDD configuration corresponding to pattern2 is used in later $P_2$ ms. A configuration manner of uplink and downlink slot quantities and uplink and downlink symbol quantities in a single period is the same as that in the foregoing. Details are not described herein again.

(4) Slot and Subcarrier Spacing

The slot is a time unit used to transmit DL data, UL data, or SL data. Optionally, the slot includes 14 or 12 OFDM symbols. In a 5G NR system, for different subcarrier spacings (subcarrier spacing, SCS), one frame (frame) also includes different quantities of slots. Assuming that one frame is specified as 10 ms and an NCP is used:

in response to an SCS being 15 kHz, a 10-ms frame includes 10 slots, and a single slot corresponds to 1 ms;

in response to an SCS being 30 kHz, a 10-ms frame includes 20 slots, and a single slot corresponds to 0.5 ms;

in response to an SCS being 60 kHz, a 10-ms frame includes 40 slots, and a single slot corresponds to 0.25 ms; or in response to an SCS being 120 kHz, a 10-ms frame includes 80 slots, and a single slot corresponds to 0.125 ms.

However, in response to an ECP being used, a case in which an SCS is 60 kHz, a 10-ms frame includes 40 slots, and a single slot corresponds to 0.25 ms is supported.

Currently, an uplink-downlink TDD configuration is transferred between UEs to indicate UE to perform SL transmission in UL transmission time. In a manner, UE forwards a received uplink-downlink TDD configuration to other UE, and the other UE directly performs SL transmission based on UL transmission time in the uplink-downlink TDD configuration. In this manner, consideration of a communication status of SL transmission is lacked, and signaling overheads called for directly forwarding the uplink-downlink TDD configuration are relatively large.

In another manner, a fixed unified reference SCS for SL transmission is preconfigured in UE. In response to receiving an uplink-downlink TDD configuration, the UE indicates UL transmission time in the uplink-downlink TDD configuration to other UE based on the unified reference SCS by using a related carrier of signaling exchanged between the UEs, for example, a part of bits in a sidelink synchronization signal block (sidelink synchronization signal block, S-SSB). In this manner, although signaling overheads are reduced compared with the foregoing manner, consideration of different SL transmission in different time ranges is lacked because the fixed unified reference SCS is configured. In addition, in response to the uplink-downlink TDD configuration including a plurality of TDD patterns, in other words, corresponds to a plurality of time ranges, a limited quantity of bits possibly is unable to completely indicate the UL transmission time. Therefore, indicated UL transmission time is not accurate enough, and consequently SL transmission performed between the terminal devices causes interference to DL transmission.

For example, in response to an SL works in a frequency range 1 (Frequency range 1, FR1), an SCS that is configured for SL transmission is 15 kHz, 30 kHz, or 60 kHz. In response to the uplink-downlink TDD configuration including pattern1 and pattern2, a UL slot quantity in a first period corresponding to pattern1 is indicated by using 4 bits in 8 bits, and a UL slot quantity in a second period corresponding to pattern2 is indicated by using the other 4 bits. In this case, a value range of the UL slot quantity that is represented by 4 bits is 0 to 15. For example, a unified reference SCS is configured as 60 kHz, and a maximum UL slot quantity corresponding to pattern1/pattern2 is shown in the following Table 1.

TABLE 1

| Number | Total period $P + P_2$ (ms) | First period P (ms) | Second period $P_2$ (ms) | Maximum UL slot quantity in pattern 1 | Maximum UL slot quantity in pattern 2 |
|---|---|---|---|---|---|
| 0 | 1 | 0.5 | 0.5 | 2 | 2 |
| 1 | 2 | 1 | 1 | 4 | 4 |
| 2 | 2.5 | 0.5 | 2 | 2 | 8 |
| 3 | 2.5 | 1.25 | 1.25 | 5 | 5 |
| 4 | 2.5 | 2 | 0.5 | 8 | 2 |
| 5 | 4 | 1 | 3 | 4 | 12 |
| 6 | 4 | 2 | 2 | 8 | 8 |
| 7 | 4 | 3 | 1 | 12 | 4 |
| 8 | 5 | 1 | 4 | 4 | 16 |
| 9 | 5 | 2 | 3 | 8 | 12 |
| 10 | 5 | 2.5 | 2.5 | 10 | 10 |
| 11 | 5 | 3 | 2 | 12 | 8 |
| 12 | 5 | 4 | 1 | 16 | 4 |
| 13 | 10 | 5 | 5 | 20 | 20 |
| 14 | 20 | 10 | 10 | 40 | 40 |

For example, a maximum UL slot quantity in pattern2 of the number 8 is 16, a maximum UL slot quantity in pattern1 of the number 12 is 16, and the two quantities exceed the value range that is represented by 4 bits. Maximum slot quantities in pattern1/pattern2 that correspond to the number 13 and the number 14 both exceed the value range that is represented by 4 bits. In some embodiments, in the foregoing manner, a UL slot quantity corresponding to one of two TDD patterns is indicated by using 4 bits based on a unified SCS, but the indication is unable to be accurate.

Based on this, some embodiments provide a configuration information indication method and apparatus, to indicate, to another terminal device, UL transmission time corresponding to different period information in an uplink-downlink TDD configuration, so that the another terminal device pertinently accurately performs SL transmission based on the indicated UL transmission time in period time corresponding to the different period information. Therefore, interference to DL transmission is avoided. Because a problem-resolving principle of the method is the same as that of the apparatus, mutual reference is made to method embodiments and apparatus embodiments, and no repeated description is provided.

The following further describes in detail embodiments with reference to the accompanying drawings.

Figure 3:
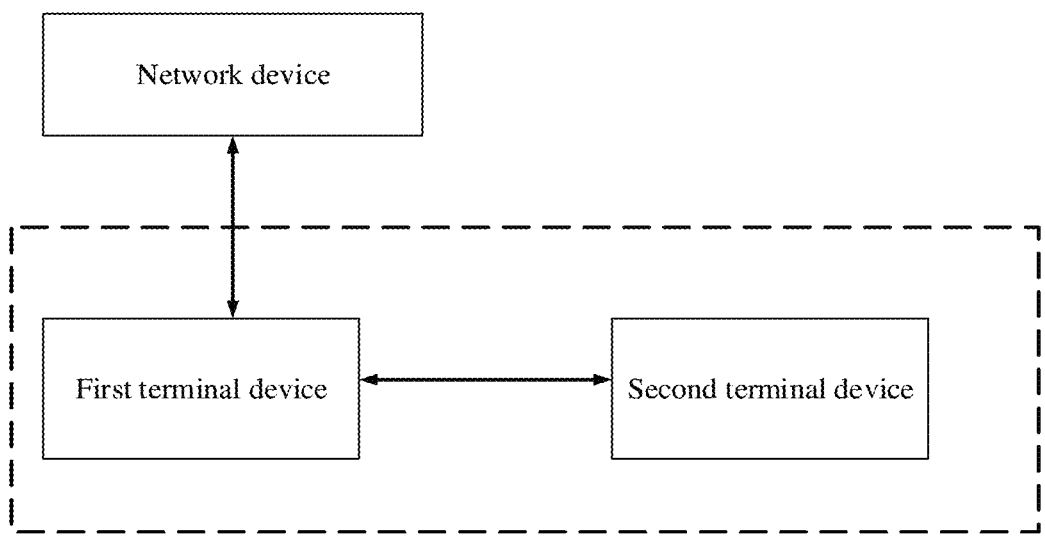
FIG. 3 is a schematic diagram of an architecture of a communication system in accordance with some embodiments.

First, FIG. 3 illustrates an architecture of a communication system. The communication system includes a first terminal device and a second terminal device.

The first terminal device is configured to: receive an uplink-downlink TDD configuration from a network device (for example, the foregoing gNB), and for period information in the uplink-downlink TDD configuration, indicate UL transmission time corresponding to the period information to the second terminal device with reference to an SL reference SCS corresponding to the period information.

The second terminal device is configured to determine, in period time of the period information based on the indication of the first terminal device for the UL transmission time corresponding to the period information, time that is used for SL transmission.

In some embodiments, the first terminal device determines the SL reference SCS corresponding to the period information for the period information, and indicates the UL transmission time corresponding to the period information to the second terminal device, so that interference caused by SL transmission performed between the terminal devices to DL transmission performed between the network device and the terminal device is avoided. In addition, the network device is further illustrated in FIG. 3.

In some embodiments, indicating the UL transmission time further is understood as indicating SL transmission time. This is not limited herein.

In some embodiments, the second terminal device further sends the indication of the first terminal device to another terminal device.

In some embodiments, the first terminal device directly indicates the UL transmission time corresponding to the period information to the second terminal device by sending a radio signal to the second terminal device. In another optional implementation, the first terminal device may indirectly indicate the UL transmission time corresponding to the period information to the second terminal device by using an intermediate device, that is, first send a radio signal to the intermediate device to indicate the UL transmission time corresponding to the period information to the intermediate device, and then forward, by using the intermediate device, the UL transmission time corresponding to the period information to the second terminal device.

In some embodiments, the first terminal device is an edge device in a coverage area of the network device, and the second terminal device is a device that directly or indirectly performs wireless communication with the first terminal device and that is located outside the coverage area of the network device, thereby preventing SL transmission between the edge device and the device outside the area from interfering with DL transmission in the area.

In some embodiments, the first terminal device sends, to the second terminal device by using a PC5 interface, a sidelink synchronization signal block (sidelink synchronization signal block, S-SSB) that carries related indication information of the UL transmission time corresponding to the period information. Based on this, this embodiment is applied to an S-SSB sending and receiving scenario in an SL scenario. The SL scenario includes a vehicle to everything (vehicle to everything, V2X) communication scenario, a device to device (device to device, D2D) communication scenario, or the like. In some embodiments, the S-SSB further is referred to as a sidelink synchronization signal/physical sidelink broadcast channel block (S-SS/PSBCH block).

Figure 4:
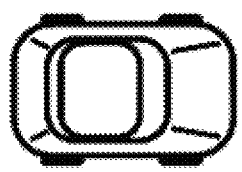
FIG. 4 is a schematic diagram of an application scenario in accordance with some embodiments.
Figure 4:

For ease of understanding, an embodiment provides a schematic diagram of an application scenario by using a vehicle to vehicle (vehicle to vehicle, V2V) communication scenario in vehicle to everything communication as an example. As shown in FIG. 4, the scenario includes transmit end UE (the foregoing first terminal device) and receive end UE (the foregoing second terminal device). For example, both the transmit end UE and the receive end UE in FIG. 4 are vehicle UE. However, in some embodiments, the transmit end UE and the receive end UE is terminal devices in any form in an application scenario. This is not limited herein.

The transmit end UE is an S-SSB sending entity in an SL scenario. The transmit end UE enables, by sending an S-SSB, another terminal device to implement time synchronization with the transmit end UE, thereby implementing an SL communication function. In addition, the transmit end UE further transmits, by sending the S-SSB, related indication information of UL transmission time corresponding to period information.

The receive end UE is an S-SSB receiving entity in the SL scenario. The receive end UE implements time synchronization with another terminal device by receiving an S-SSB, thereby implementing an SL communication function. In addition, the receive end UE parses related indication information that is of UL transmission time corresponding to period information and that is transmitted in the S-SSB. In response to performing SL transmission, the receive end UE avoids interference to DL transmission based on the indication information.

Figure 5:
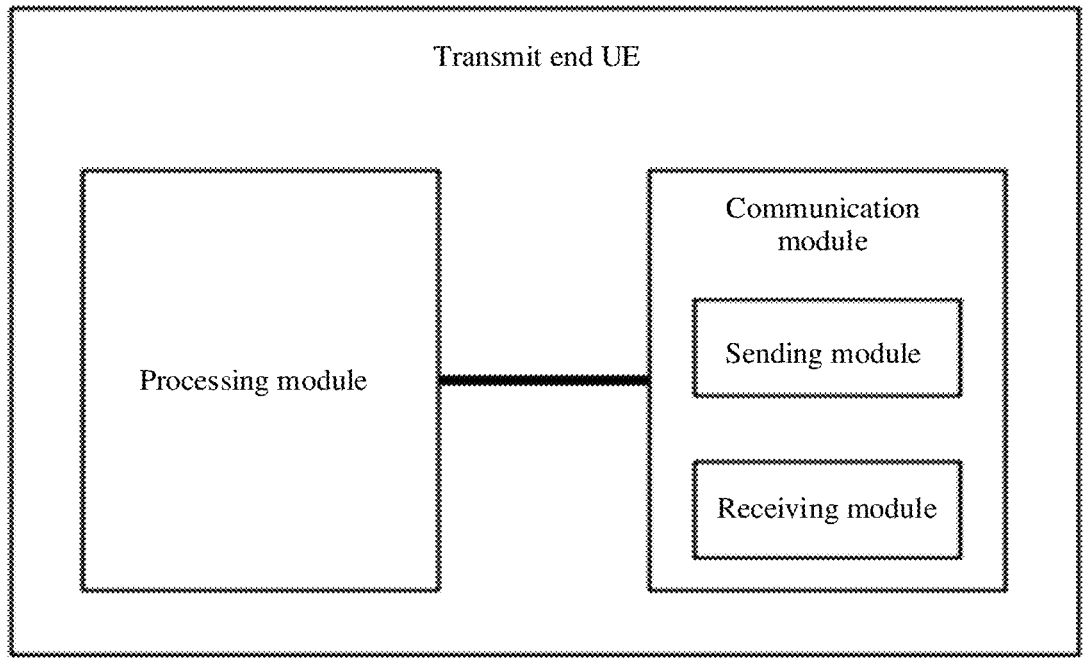
FIG. 5 is a hardware module diagram of transmit end UE in accordance with some embodiments.
Figure 6:
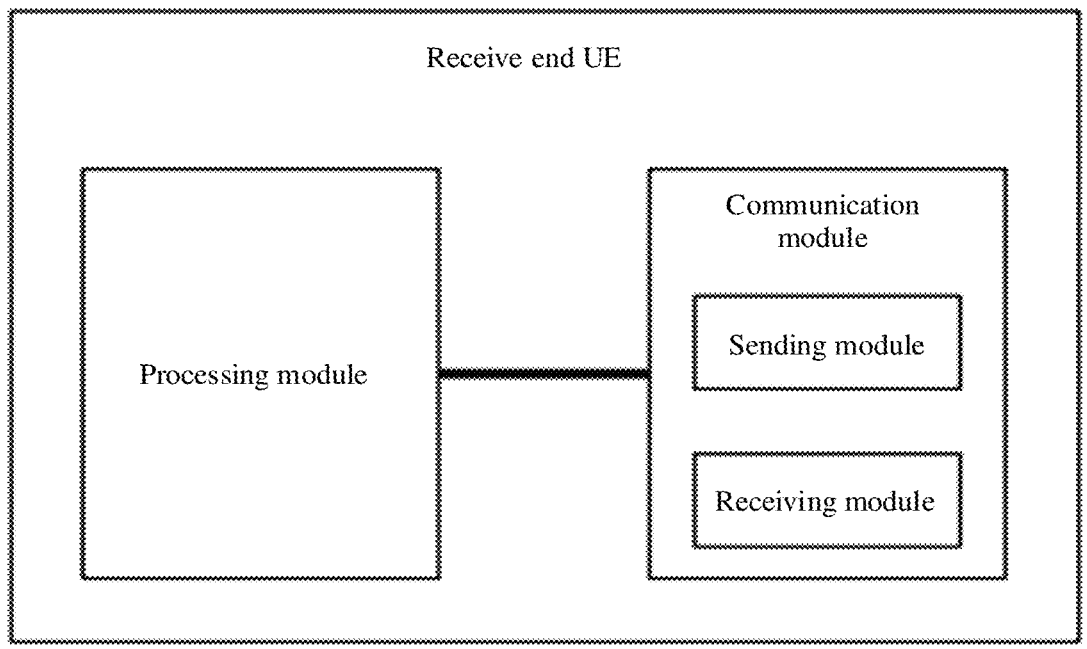
FIG. 6 is a hardware module diagram of receive end UE in accordance with some embodiments.

With reference to a hardware module diagram of transmit end UE in FIG. 5, the foregoing transmit end UE includes a processing module and a communication module. The processing module is configured to process an algorithm, software, a program, storage, or the like in a communication process. The communication module includes a sending module and a receiving module. The sending module is configured to send a radio signal, such as an S-SSB, SL data, or UL data. The receiving module is configured to receive a radio signal, such as an S-SSB, SL data, or DL data. With reference to a hardware module diagram of receive end UE in FIG. 6, the receive end UE includes a processing module and a communication module. The processing module is configured to process an algorithm, software, a program, storage, or the like in a communication process. The communication module includes a sending module and a receiving module. The sending module is configured to send a radio signal, such as an S-SSB or SL data. The receiving module is configured to receive a radio signal, such as an S-SSB or SL data.

Figure 7:
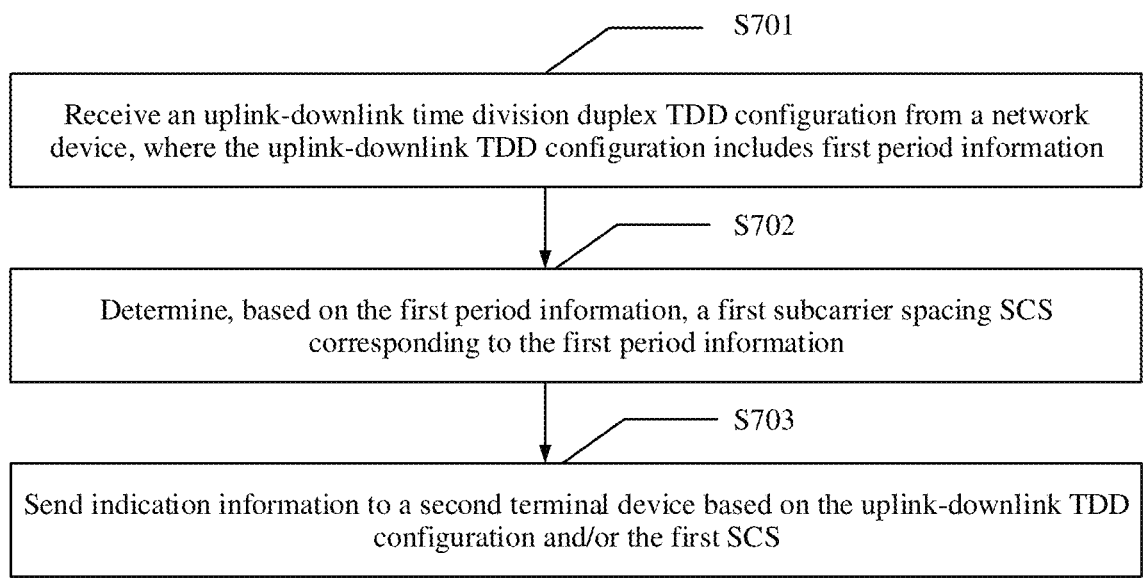
FIG. 7 is a schematic flowchart of a configuration information indication method in accordance with some embodiments.

For ease of implementation, with reference to FIG. 7, an embodiment provides a configuration information indication method. The method is applied to a first terminal device and includes the following steps:

Step S701: Receive an uplink-downlink time division duplex TDD configuration from a network device, where the uplink-downlink TDD configuration includes first periodicity information.

Step S702: Determine, based on the first periodicity information, a first subcarrier spacing SCS corresponding to the first periodicity information, where the first SCS is used to indicate a sidelink SL reference SCS.

Step S703: Send indication information to a second terminal device based on the uplink-downlink TDD configuration and/or the first SCS, where the indication information is used to indicate uplink UL transmission time corresponding to the first periodicity information.

In some embodiments, the first terminal device determines corresponding SL reference SCSs for different period information, for example, determines the first SCS corresponding to the first periodicity information for the first periodicity information; and then pertinently indicates UL transmission time corresponding to period information included in the uplink-downlink TDD configuration to the second terminal device based on the SL reference SCSs corresponding to the different periods and the uplink-downlink TDD configuration, so that the second terminal device accurately performs SL transmission based on the indicated UL transmission time in period time corresponding to the period information, thereby avoiding interference to DL transmission.

In some embodiments, the first periodicity information includes period time of each of one or more TDD patterns.

For example, in response to one TDD pattern, namely, pattern1, is configured for uplink-downlink TDD, the first periodicity information includes period time of pattern1. Optionally, the period time of pattern1 is any one of period ranges {0.5 ms, 0.625 ms, 1 ms, 1.25 ms, 2 ms, 2.5 ms, 4 ms, 5 ms, 10 ms} shown in the following Table 2, or any one of period ranges {0.5 ms, 0.625 ms, 1 ms, 1.25 ms, 2 ms, 2.5 ms, 5 ms, 10 ms} shown in the following Table 3.

TABLE 2

| Number | Period P (ms) |
| --- | --- |
| 0 | 0.5 |
| 1 | 0.625 |
| 2 | 1 |
| 3 | 1.25 |
| 4 | 2 |
| 5 | 2.5 |
| 6 | 4 |
| 7 | 5 |
| 8 | 10 |
| 9 to 15 | Reserved |

TABLE 3

| Number | Period P (ms) |
| --- | --- |
| 0 | 0.5 |
| 1 | 0.625 |
| 2 | 1 |
| 3 | 1.25 |

TABLE 3-continued

| Number | Period P (ms) |
|---|---|
| 4 | 2 |
| 5 | 2.5 |
| 6 | 5 |
| 7 | 10 |
| 8 to 15 | Reserved |

Different numbers correspond to different periods, and a period is determined based on a number. In some embodiments, a correspondence between a number and a period in the foregoing Table 1 and Table 3 is not limited. In addition, an actually used period is shown in one row or several rows shown in the table, the rows in the table, or more rows than those shown in the table.

Optionally, in this example, an SL reference SCS is preset for any period, or SL reference SCSs respectively corresponding to different periods are determined for the different periods based on communication statuses. In this case, in response to the uplink-downlink TDD configuration including the first periodicity information is received, the first SCS corresponding to the first periodicity information is determined based on the foregoing manner. Further, optionally, the SL reference SCS is represented by using $15\ \text{kHz} \times 2^{\mu_{ref}^{SL}}$ and $\mu_{ref}^{SL}=3$ is preset for any period.

For example, two TDD patterns, namely, a first TDD pattern (pattern1) and a second TDD pattern (pattern2), are configured for uplink-downlink TDD, and period time of the two TDD patterns is respectively a first period P ms and a second period $P_2$ ms. There are J period combinations including the first period and the second period. A value of J is determined according to a specification of an NR Uu interface: 20 ms needs to be divided by $(P+P_2)$ without a remainder, in other words, $20\ \text{ms}/(P+P_2)$ is an integer. Under this condition, in response to two optional periods 3 ms and 4 ms being considered, the value of J is 16, that is, there are 16 combinations of the two periods; or in response to two optional periods 3 ms and 4 ms being not considered, the value of J is 10, that is, there are 10 combinations of the two periods.

For ease of understanding, for example, the two optional periods 3 ms and 4 ms are considered, a value range of each of the first period and the second period is {0.5 ms, 0.625 ms, 1 ms, 1.25 ms, 2 ms, 2.5 ms, 3 ms, 4 ms, 5 ms, 10 ms}, and therefore there are 16 period combinations. A period combination corresponding to period time of the first TDD pattern and period time of the second TDD pattern is any one of 16 period combinations shown in the following Table 4:

TABLE 4

| Number | Total period P + P$_2$ (ms) | First period P (ms) | Second period P$_2$ (ms) |
|---|---|---|---|
| 0 | 1 | 0.5 | 0.5 |
| 1 | 1.25 | 0.625 | 0.625 |
| 2 | 2 | 1 | 1 |
| 3 | 2.5 | 0.5 | 2 |
| 4 | 2.5 | 1.25 | 1.25 |
| 5 | 2.5 | 2 | 0.5 |
| 6 | 4 | 1 | 3 |
| 7 | 4 | 2 | 2 |
| 8 | 4 | 3 | 1 |
| 9 | 5 | 1 | 4 |
| 10 | 5 | 2 | 3 |
| 11 | 5 | 2.5 | 2.5 |
| 12 | 5 | 3 | 2 |
| 13 | 5 | 4 | 1 |
| 14 | 10 | 5 | 5 |
| 15 | 20 | 10 | 10 |

Different numbers correspond to different period combinations, and a period combination is determined based on a number. However, in some embodiments, a correspondence between a number and a period combination in the foregoing Table 4 is not limited. In addition, an actually used period combination is shown in one row or several rows shown in the table, the rows in the table, or more rows than those shown in the table.

Optionally, with reference to consideration of an SL communication status, an SL reference SCS corresponding to each period combination is set for the period combination. Different period combinations corresponds to a same SL reference SCS based on an status. This is not limited herein. During implementation, a mapping table is further constructed to represent a mapping relationship between a period combination and an SL reference SCS, thereby helping subsequently determine an SCS corresponding to a period combination. The 16 period combinations in Table 4 are used as an example. The mapping table records the mapping relationship in the following two forms.

First form: The SL reference SCS is represented by using $15\ \text{kHz} \times 2^{\mu_{ref}^{SL}}$, and a mapping relationship between a number corresponding to a period combination and an SL reference SCS configuration ($\mu_{ref}^{SL}$) is recorded in the mapping table, to reflect the mapping relationship between a period combination and an SL reference SCS, as shown in Table 5:

TABLE 5

| Number | SL reference SCS configuration $\mu_{ref}^{SL}$ |
|---|---|
| 0 to 5 | 3 |
| 6 to 13 | 2 |
| 14 | 1 |
| 15 | 0 |

For example, in response to a determination that a number of a period combination corresponding to an SL reference SCS is 13, based on the number 13 and the mapping table in Table 5, that an SL reference SCS configuration corresponding to the period combination is $\mu_{ref}^{SL}=2$, and then a determination that the SL reference SCS corresponding to the period combination is $15\ \text{kHz} \times 2^2 = 60\ \text{kHz}$.

Second form: The SL reference SCS is represented by using $15\ \text{kHz} \times 2^{\mu_{ref}^{SL}}$, and a mapping relationship between each period combination and an SL reference SCS configuration ($\mu_{ref}^{SL}$) recorded in the mapping table, to reflect the mapping relationship between a period combination and an SL reference SCS, as shown in Table 6:

TABLE 6

| First period P (ms) | Second period P$_2$ (ms) | SL reference SCS configuration $\mu_{ref}^{SL}$ |
|---|---|---|
| 0.5 | 0.5 | 3 |
| 0.625 | 0.625 | 3 |
| 1 | 1 | 3 |
| 0.5 | 2 | 3 |
| 1.25 | 1.25 | 3 |

TABLE 6-continued

| First period P (ms) | Second period P$_2$ (ms) | SL reference SCS configuration $\mu_{ref}^{SL}$ |
|---|---|---|
| 2 | 0.5 | 3 |
| 1 | 3 | 2 |
| 2 | 2 | 2 |
| 3 | 1 | 2 |
| 1 | 4 | 2 |
| 2 | 3 | 2 |
| 2.5 | 2.5 | 2 |
| 3 | 2 | 2 |
| 4 | 1 | 2 |
| 5 | 5 | 1 |
| 10 | 10 | 0 |

For example, in response to a determination that a period combination corresponding to an SL reference SCS is P=4 ms and P$_2$=1 ms, based on the period combination of P and P$_2$ and the mapping table in Table 6, that an SL reference SCS configuration corresponding to the period combination is $\mu_{ref}^{SL}$=2, and then a determination that the SL reference SCS corresponding to the period combination is 15 kHz× 2$^2$=60 kHz.

In addition, in some embodiments, a correspondence between a period combination and an SL reference SCS configuration in Table 6 is not limited, and is adjusted based on an status. For example, the SL reference SCS configuration corresponding to the period combination of P=1 ms and P$_2$=3 ms is not 2 but 3, an SL reference SCS configuration corresponding to a period combination of P=5 ms and P$_2$=5 ms is not 1 but 2, and an SL reference SCS configuration corresponding to a period combination P=10 ms and P$_2$=10 ms is not 0 but 1. In addition, an actually used mapping table is shown in one row or several rows shown in Table 6, the rows in Table 6, or more rows than those shown in Table 6.

In some embodiments, the determining a first subcarrier spacing SCS corresponding to the first periodicity information includes: determining, based on a mapping relationship between the first periodicity information and the first SCS, the first SCS corresponding to the first periodicity information. The mapping relationship is determined based on a record in the foregoing pre-constructed mapping table.

In some embodiments, SL reference SCSs having mapping relationships with different period information are set for the different period information, for example, the first SCS is set for the first periodicity information. In period time corresponding to the different period information, the terminal device pertinently determines, based on the SL reference SCSs corresponding to the different period information, UL transmission time that is occupied to perform SL transmission, so that SL transmission between the terminal devices is more flexible.

In some embodiments, in response to the first periodicity information including period time of one TDD pattern, the UL transmission time corresponding to the first periodicity information is a UL slot quantity corresponding to the period time of the TDD pattern; or in response to the first periodicity information including period time of a first TDD pattern and period time of a second TDD pattern, the UL transmission time corresponding to the first periodicity information includes a UL slot quantity corresponding to the period time of the first TDD pattern and a UL slot quantity corresponding to the period time of the second TDD pattern.

In some embodiments, the indication information includes a first bit sequence, and the first bit sequence is used to indicate a UL slot quantity corresponding to the period time of each of the one or more TDD patterns included in the first periodicity information. For example, the first periodicity information includes the period time of the first TDD pattern and the period time of the second TDD pattern. The first bit sequence is used to indicate the UL slot quantity corresponding to the period time of the first TDD pattern and the UL slot quantity corresponding to the period time of the second TDD pattern.

In some embodiments, UL slot quantities of period time of a plurality of TDD patterns are jointly indicated by using the first bit sequence. For example, the UL slot quantity corresponding to the period time of the first TDD pattern and the UL slot quantity corresponding to the period time of the second TDD pattern are jointly indicated. A binary value represented by the first bit sequence is related to an indication parameter, and the indication parameter includes at least one of the following parameters: the period time of the first TDD pattern, the period time of the second TDD pattern, the UL slot quantity corresponding to the period time of the first TDD pattern, the UL slot quantity corresponding to the period time of the second TDD pattern, and the first SCS. In this case, before the sending indication information to a second terminal device, the method further includes: determining the first bit sequence based on the indication parameter.

In some embodiments, the first bit sequence is determined based on a function relationship including some or all of parameters included in the indication parameter. Optionally, an uplink slot indicator (uplink slot indicator, USI) corresponding to the first bit sequence is first determined based on the function relationship including some or all of the parameters included in the indication parameter; and then the first bit sequence is determined based on the USI, where the first bit sequence is a binary representation of the USI.

For ease of implementation, this embodiment provides the following four function relationship formulas. Determining, based on any function relationship formula, the USI corresponding to the first bit sequence, and determining the first bit sequence based on the USI are described in detail.

(1) First function relationship formula:

$$USI=u_1\times(P_2\times2^{\mu_{ref}^{SL}}+1)+u_2, \text{ wherein:}$$

u$_1$ represents the UL slot quantity corresponding to the period time of the first TDD pattern, P$_2$ represents the period time of the second TDD pattern, u$_2$ represents the UL slot quantity corresponding to the period time of the second TDD pattern, and $2^{\mu_{ref}^{SL}}$ is a coefficient determined based on the first SCS. For example, in response to the first SCS being 15 kHz×2$^2$=60 kHz, $2^{\mu_{ref}^{SL}}$ is 4.

For example, in response to a determination that P$_2$=1 ms, u$_1$=8, $2^{\mu_{ref}^{SL}}$=4, and u$_2$=0, USI=8×(1×4+1)+0=40; and in response to the first bit sequence including 7 bits, a determination, based on the USI, that the first bit sequence is 0101000.

(2) Second function relationship formula:

$$USI=u_1+u_2\times(P\times2^{\mu_{ref}^{SL}}+1), \text{ wherein:}$$

u$_1$ represents the UL slot quantity corresponding to the period time of the first TDD pattern, u$_2$ represents the UL slot quantity corresponding to the period time of the second TDD pattern, P represents the period time of the first TDD pattern, and $2^{\mu_{ref}^{SL}}$ is a coefficient determined based on the first SCS. For example, in response to the first SCS being 15 kHz×2$^2$=60 kHz, $2^{\mu_{ref}^{SL}}$ is 4.

For example, in response to a determination that P=2.5 ms, u$_1$=6, $2^{\mu_{ref}^{SL}}$=4, and u$_2$=2, USI=6+2×(2.5×4+1)=28; and in response to the first bit sequence including 7 bits, a determination, based on the USI, that the first bit sequence is 0011100.

(3) Third function relationship formula:

$$USI=(P\times 2^{\mu_{ref}^{SL}}-u_1)\times(P_2\times 2^{\mu_{ref}^{SL}}+1)+(P_2\times 2^{\mu_{ref}^{SL}}-u_2),$$
where $u_1$ represents the UL slot quantity corresponding to the period time of the first TDD pattern, $u_2$ represents the UL slot quantity corresponding to the period time of the second TDD pattern, P represents the period time of the first TDD pattern, $P_2$ represents the period time of the second TDD pattern, and $2^{\mu_{ref}^{SL}}$ is a coefficient determined based on the first SCS. For example, in response to the first SCS being 15 kHz$\times 2^2$=60 kHz, $2^{\mu_{ref}^{SL}}$ is 4.

For example, in response to a determination that P=4 ms, $P_2$=1 ms, $2^{\mu_{ref}^{SL}}$=4, $u_1$=8, and $u_2$=0, USI=(4×4−8)×(1×4+1)+(1×4−0)=44; and in response to the first bit sequence including 7 bits, a determination, based on the USI, that the first bit sequence is 0101100.

(4) Fourth function relationship formula:

$$USI=(P\times 2^{\mu_{ref}^{SL}}-u_1)+(P_2\times 2^{\mu_{ref}^{SL}}-u_2)\times(P\times 2^{\mu_{ref}^{SL}}+1),$$
where $u_1$ represents the UL slot quantity corresponding to the period time of the first TDD pattern, $u_2$ represents the UL slot quantity corresponding to the period time of the second TDD pattern, P represents the period time of the first TDD pattern, $P_2$ represents the period time of the second TDD pattern, and $2^{\mu_{ref}^{SL}}$ is a coefficient determined based on the first SCS. For example, in response to the first SCS being 15 kHz$\times 2^2$=60 kHz, $2^{\mu_{ref}^{SL}}$ is 4.

For example, in response to a determination that P=2.5 ms, $P_2$=2.5 ms, $2^{\mu_{ref}^{SL}}$=4, $u_1$=6, and $u_2$=2, USI=(2.5×4−6)+(2.5×4−2)×(2.5×4+1)=92; and in response to the first bit sequence including 7 bits, a determination, based on the USI, that the first bit sequence is 1011100.

In some embodiments, the uplink slot indicator USI is determined by using the function relationship formula that represents a relationship between related parameters included in the indication parameter, and then the first bit sequence is determined based on the USI, to implement a joint indication of the UL slot quantities corresponding to the period time of the two TDD patterns, thereby ensuring that the UL slot quantities corresponding to the period time of the two TDD patterns are completely and accurately indicated by using a limited quantity of bits. This is relatively flexible.

In some embodiments, considering that in response to the UL transmission time corresponding to the first periodicity information being indicated by using the first bit sequence, a quantity of bits of the first bit sequence is limited, to ensure that the UL transmission time is completely indicated by using the first bit sequence in the first periodicity information, consideration of the quantity of bits of the first bit sequence is introduced in response to the first SCS corresponding to the first periodicity information being configured. The determining a first subcarrier spacing SCS corresponding to the first periodicity information is alternatively implemented with reference to the following manner:

determining a first set based on a second SCS and the period time of the first TDD pattern; determining a second set based on the second SCS and the period time of the second TDD pattern; and in response to determining that a quantity of elements included in a third set being less than or equal to the first threshold, determining the second SCS as the first SCS.

The first set is used to indicate a value range of the UL slot quantity corresponding to the period time of the first TDD pattern. The second set is used to indicate the value range of the UL slot quantity corresponding to the period time of the second TDD pattern. The third set is determined based on a direct product of the first set and the second set, and the first threshold is determined based on the quantity of bits of the first bit sequence.

In some embodiments, SL reference SCSs corresponding to different period information are configured based on consideration of a limited quantity of bits of the first bit sequence, namely, a limited quantity of values that are represented by the first bit sequence, to ensure that the first bit sequence indicates UL slot quantities of possible values corresponding to the different period information, thereby ensuring that the terminal device that receives the indication information accurately determines occupiable UL transmission time in period time corresponding to the different period information, to perform SL transmission. Therefore, interference to DL transmission is avoided.

For ease of understanding, the following describes in detail a process of determining the first SCS in this embodiment. Assuming that the second SCS is 15 kHz$\cdot 2^{\mu_{ref}^{SL'}}$, a quantity of values of the UL slot quantity corresponding to the period time P ms of the first TDD pattern is $N_1=P\times 2^{\mu_{ref}^{SL'}}+1$, and a quantity of values of the UL slot quantity corresponding to the period time $P_2$ ms of the second TDD pattern is $N_1=P_2\times 2^{\mu_{ref}^{SL'}}+1$. In response to $N_1\times N_2 \leq 2^Z$ a value of $2^{\mu_{ref}^{SL'}}$ being determined, where Z is the quantity of bits of the first bit sequence; and then the second SCS obtained through calculation based on determined $2^{\mu_{ref}^{SL'}}$ is determined as the first SCS. In this manner, in some embodiments, the first bit sequence completely indicates the UL slot quantity corresponding to the period time of the first TDD pattern and the UL slot quantity corresponding to the period time of the second TDD pattern. For example, in response to Z=7, P=4 ms, and $P_2$=1 ms, a maximum quantity of binary values that is represented by the first bit sequence is $2^Z$=128, and a range is 0 to 127. Based on the condition $N_1\times N_2<2^Z$, a determination that the value of $2^{\mu_{ref}^{SL'}}$ is 2. In this case, there are 17 values of the UL slot quantity corresponding to the period time P ms of the first TDD pattern, there are 5 values of the UL slot quantity corresponding to the period time $P_2$ ms of the second TDD pattern, there are 85 period combinations, and the first bit sequence completely indicates any integer value in a range of 0 to 85.

In some embodiments, UL slot quantities corresponding to period time of the one or more TDD patterns included in the first periodicity information is determined based on a ratio of the first SCS to a reference SCS included in the uplink-downlink TDD configuration.

For example, in response to the first periodicity information including the period time of the first TDD pattern and the period time of the second pattern, the UL slot quantity corresponding to the period time of the first TDD pattern and the UL slot quantity corresponding to the period time of the second TDD pattern is determined based on the ratio of the first SCS to the reference SCS included in the uplink-downlink TDD configuration.

This is implemented with reference to the following manner (1) or manner (2):

Manner (1): A reference UL slot quantity that corresponds to the period time of the first TDD pattern and that is included in the uplink-downlink TDD configuration is adjusted based on the ratio of the first SCS to the reference SCS included in the uplink-downlink TDD configuration, so that the UL slot quantity corresponding to the period time of the first TDD pattern is determined. For ease of understanding, this embodiment further provides a function relationship formula for calculating the UL slot quantity corresponding to the first TDD pattern, as follows:

$$u_1 = \lfloor u_{slots} \cdot 2^{\mu_{ref}^{SL}}/2^{\mu_{ref}} \rfloor, \text{ where}$$

$u_1$ represents the UL slot quantity corresponding to the period time of the first TDD pattern, $\lfloor \ \rfloor$ represents rounding down, $u_{slots}$ represents the reference UL slot quantity that corresponds to the period information of the first TDD pattern and that is included in the uplink-downlink TDD configuration, $15 \text{ kHz} \cdot 2^{\mu_{ref}^{SL}}$ is used to represent the first SCS, $15 \text{ kHz} \cdot 2^{\mu_{ref}}$ is used to represent the reference SCS included in the uplink-downlink TDD configuration, and $2^{\mu_{ref}^{SL}}/2^{\mu_{ref}}$ represents the ratio of the first SCS to the reference SCS.

A reference UL slot quantity that corresponds to the period time of the second TDD pattern and that is included in the uplink-downlink TDD configuration is adjusted based on the ratio of the first SCS to the reference SCS included in the uplink-downlink TDD configuration, so that the UL slot quantity corresponding to the period time of the second TDD pattern is determined. For ease of understanding, this embodiment further provides another function relationship formula for calculating the UL slot quantity corresponding to the second TDD pattern, as follows:

$$u_2 = \lfloor u_{slot,2} \cdot 2^{\mu_{ref}^{SL}}/2^{\mu_{ref}} \rfloor, \text{ where}$$

$u_2$ represents the UL slot quantity corresponding to the period time of the second TDD pattern, $\lfloor \ \rfloor$ represents rounding down, $u_{slots2}$ represents the reference UL slot quantity that corresponds to the period information of the second TDD pattern and that is included in the uplink-downlink TDD configuration, $15 \text{ kHz} \cdot 2^{\mu_{ref}^{SL}}$ is used to represent the first SCS, $15 \text{ kHz} \cdot 2^{\mu_{ref}}$ is used to represent the reference SCS included in the uplink-downlink TDD configuration, and $2^{\mu_{ref}^{SL}}/2^{\mu_{ref}}$ represents the ratio of the first SCS to the reference SCS.

Figure 8:
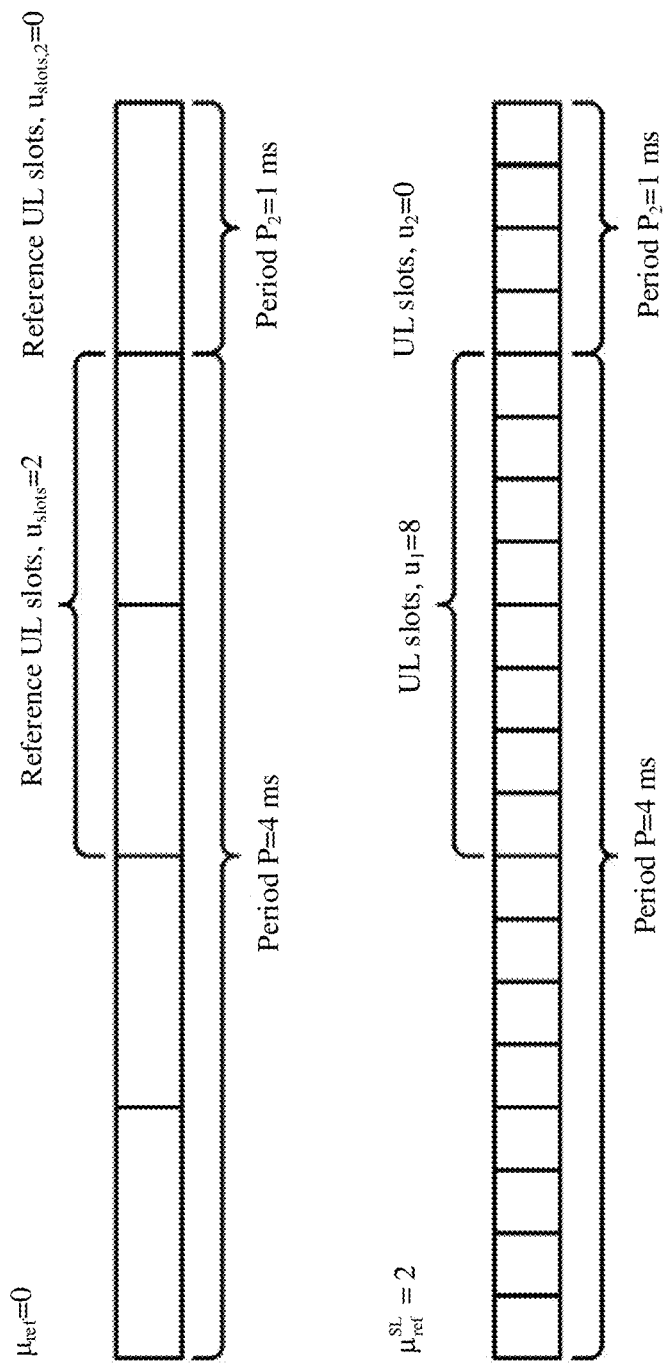
FIG. 8 is a schematic diagram of comparison between UL slot quantities in accordance with some embodiments.

For example, a reference SCS configuration in the uplink-downlink TDD configuration of the Uu interface is $\mu_{ref}=0$; the period time of the first TDD pattern is P=4 ms, and the corresponding reference UL slot quantity is $u_{slots}=2$; the period time of the second TDD pattern is $P_2=1$ ms, and the corresponding reference UL slot quantity is $u_{slots,2}=0$; and an SL reference SCS configuration preset for the period combination of P=4 ms and $P_2=1$ ms is $2^{\mu_{ref}^{SL}}=2$. In this case, $u_1=\lfloor 2 \cdot 2^{2-0} \rfloor=8$, and $u_2=\lfloor 0 \cdot 2^{2-0} \rfloor=0$. Based on the foregoing parameter setting, as shown in FIG. 8, this embodiment provides a schematic diagram of comparison between UL slot quantities. Correspondences between the reference UL slot quantities in the uplink-downlink TDD configuration and the UL slot quantities indicated by the indication information are shown.

Figure 9:
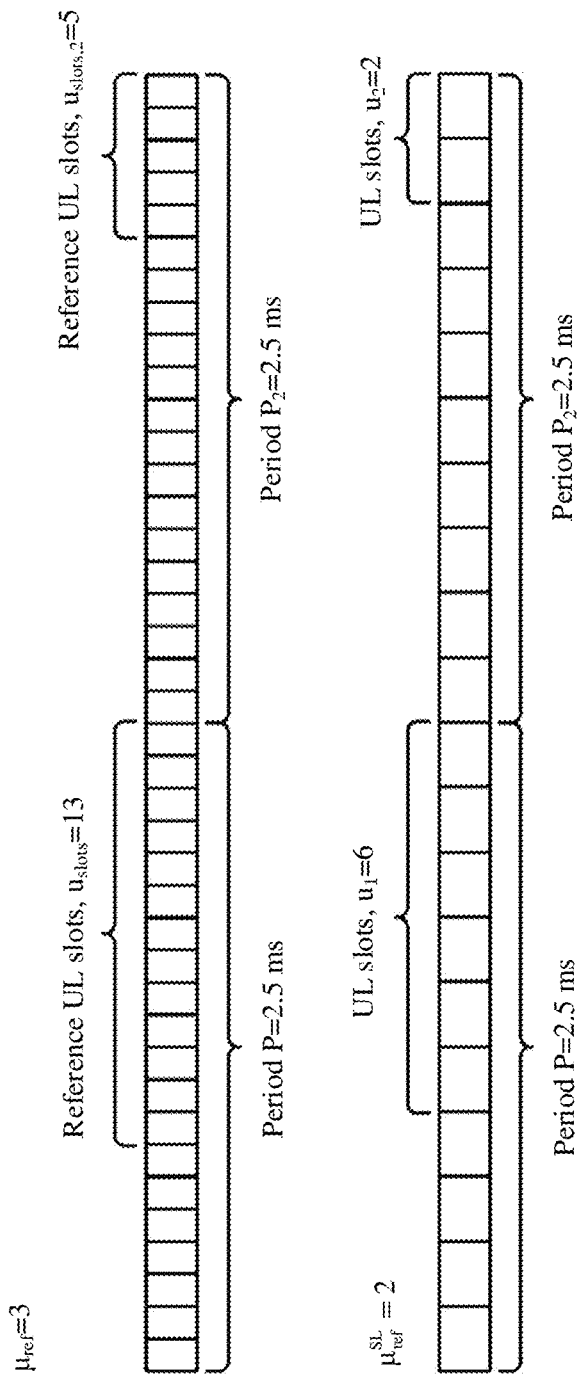
FIG. 9 is another schematic diagram of comparison between UL slot quantities in accordance with some embodiments.

For example, a reference SCS configuration in the uplink-downlink TDD configuration of the Uu interface is $\mu_{ref}=3$; the period time of the first TDD pattern is P=2.5 ms, and the corresponding reference UL slot quantity is $u_{slots}=13$; the period time of the second TDD pattern is $P_2=2.5$ ms, and the corresponding reference UL slot quantity is $u_{slots,2}=5$; and an SL reference SCS configuration preset for the period combination of P=2.5 ms and $P_2=2.5$ ms is $\mu_{ref}^{SL}=2$. In this case, $u_1=\lfloor 13 \cdot 2^{2-3} \rfloor=6$ and $u_2=\lfloor 5 \cdot 2^{2-3} \rfloor=2$. Based on the foregoing parameter setting, as shown in FIG. 9, this embodiment provides another schematic diagram of comparison between UL slot quantities. Correspondences between the reference UL slot quantities in the uplink-downlink TDD configuration and the UL slot quantities indicated by the indication information are shown.

Manner (2): A reference UL slot quantity that corresponds to the period time of the first TDD pattern and that is included in the uplink-downlink TDD configuration and a reference UL symbol quantity that corresponds to the period time of the first TDD pattern and that is included in the uplink-downlink TDD configuration are adjusted based on the ratio of the first SCS to the reference SCS included in the uplink-downlink TDD configuration; and then the UL slot quantity corresponding to the period time of the first TDD pattern is determined based on an adjusted reference UL slot quantity and an adjusted reference UL symbol quantity. For ease of understanding, this embodiment provides another function relationship formula for calculating the UL slot quantity corresponding to the first TDD pattern, as follows:

$$u_1 = \lfloor u_{slot} \cdot 2^{\mu_{ref}^{SL}}/2^{\mu_{ref}} \rfloor + \lfloor u_{sym} \cdot 2^{\mu_{ref}^{SL}}/2^{\mu_{ref}}/14 \rfloor, \text{ where}$$

$u_1$ represents the UL slot quantity corresponding to the period time of the first TDD pattern, $\lfloor \ \rfloor$ represents rounding down, $u_{slots}$ represents the reference UL slot quantity that corresponds to the period information of the first TDD pattern and that is included in the uplink-downlink TDD configuration, $u_{sym}$ represents the reference UL symbol quantity that corresponds to the period information of the first TDD pattern and that is included in the uplink-downlink TDD configuration, $15 \text{ kHz} \cdot 2^{\mu_{ref}^{SL}}$ is used to represent the first SCS, $15 \text{ kHz} \cdot 2^{\mu_{ref}}$ is used to represent the reference SCS included in the uplink-downlink TDD configuration, and $2^{\mu_{ref}^{SL}}/2^{\mu_{ref}}$ represents the ratio of the first SCS to the reference SCS.

A reference UL slot quantity that corresponds to the period time of the second TDD pattern and that is included in the uplink-downlink TDD configuration and a reference UL symbol quantity that corresponds to the period time of the second TDD pattern and that is included in the uplink-downlink TDD configuration are adjusted based on the ratio of the first SCS to the reference SCS included in the uplink-downlink TDD configuration; and then the UL slot quantity corresponding to the period time of the second TDD pattern is determined based on an adjusted reference UL slot quantity and an adjusted reference UL symbol quantity. For ease of understanding, this embodiment provides another function relationship formula for calculating the UL slot quantity corresponding to the second TDD pattern, as follows:

$$u_2 = \lfloor u_{slot,2} \cdot 2^{\mu_{ref}^{SL}}/2^{\mu_{ref}} \rfloor + \lfloor u_{sym,2} \cdot 2^{\mu_{ref}^{SL}}/2^{\mu_{ref}}/14 \rfloor, \text{ where}$$

$u_2$ represents the UL slot quantity corresponding to the period time of the second TDD pattern, $\lfloor \ \rfloor$ represents rounding down, $u_{slots2}$ represents the reference UL slot quantity that corresponds to the period information of the second TDD pattern and that is included in the uplink-downlink TDD configuration, $u_{sym,2}$ represents the reference UL symbol quantity that corresponds to the period information of the second TDD pattern and that is included in the uplink-downlink TDD configuration, $15 \text{ kHz} \cdot 2^{\mu_{ref}^{SL}}$ is used to represent the first SCS, $15 \text{ kHz} \cdot 2^{\mu_{ref}}$ is used to represent the reference SCS included in the uplink-downlink TDD configuration, and $2^{\mu_{ref}^{SL}}/2^{\mu_{ref}}$ represents the ratio of the first SCS to the reference SCS.

For example, a reference SCS configuration in the uplink-downlink TDD configuration of the Uu interface is $\mu_{ref}=0$;

the period time of the first TDD pattern is P=4 ms, the corresponding reference UL slot quantity is $u_{slots}$=2, and the corresponding reference UL symbol quantity is $u_{sym}$=10; the period time of the second TDD pattern is $P_2$=1 ms, the corresponding reference UL slot quantity is $u_{slots,2}$=0, and the corresponding reference UL symbol quantity is $u_{sym,2}$=0; and an SL reference SCS configuration preset for the period combination of P=4 ms and $P_2$=1 ms is $\mu_{ref}^{SL}$=2. In this case, $u_1 = \lfloor 2 \cdot 2^{2-0} \rfloor + \lfloor 10 \cdot 2^{2-0}/14 \rfloor = 10$, and $u_2 = \lfloor 0 \cdot 2^{2-0} \rfloor + 0 = 0$ For example, a reference SCS configuration in the uplink-downlink TDD configuration of the Uu interface is $\mu_{ref}$=3; the period time of the first TDD pattern is P=2.5 ms, the corresponding reference UL slot quantity is $u_{slots}$=13, and the corresponding reference UL symbol quantity is $u_{sym}$=8; the period time of the second TDD pattern is $P_2$=2.5 ms, the corresponding reference UL slot quantity is $u_{slots,2}$=5, and the corresponding reference UL symbol quantity is $u_{sym,2}$=10; and an SL reference SCS configuration preset for the period combination of P=2.5 ms and $P_2$=2.5 ms is $\mu_{ref}^{SL}$=2. In this case, $u_1 = \lfloor 13 \cdot 2^{2-3} \rfloor + \lfloor 8 \cdot 2^{2-3}/14 \rfloor = 6$, and $u_2 = \lfloor 5 \cdot 2^{2-3} \rfloor + \lfloor 10 \cdot 2^{2-3}/14 \rfloor = 2$.

For another example, in response to the first periodicity information including period time of one TDD pattern, for example, the period time of the first TDD pattern, the UL slot quantity corresponding to the period time of the first TDD pattern is determined based on the ratio of the first SCS to the reference SCS included in the uplink-downlink TDD configuration.

A UL slot quantity corresponding to the period time of the TDD pattern, namely, the first TDD pattern, is determined based on the foregoing function relationship formula $u_1 = \lfloor u_{slot} \cdot 2^{\mu_{ref}^{SL}}/2^{\mu_{ref}} \rfloor$ for calculating the UL slot quantity corresponding to the first TDD pattern in the manner (1), that is, the reference UL slot quantity that corresponds to the period time of the first TDD pattern and that is included in the uplink-downlink TDD configuration is adjusted based on the ratio of the first SCS to the reference SCS included in the uplink-downlink TDD configuration, to determine the UL slot quantity corresponding to the period time of the first TDD pattern; or is determined based on the foregoing function relationship formula $u_1 = \lfloor u_{slots} \cdot 2^{\mu_{ref}^{SL}}/2^{\mu_{ref}} \rfloor + \lfloor u_{sym} \cdot 2^{\mu_{ref}^{SL}}/2^{\mu_{ref}}/14 \rfloor$ for calculating the UL slot quantity corresponding to the first TDD pattern in the manner (2), that is, the reference UL slot quantity that corresponds to the period time of the first TDD pattern and that is included in the uplink-downlink TDD configuration and the reference UL symbol quantity that corresponds to the period time of the first TDD pattern and that is included in the uplink-downlink TDD configuration are adjusted based on the ratio of the first SCS to the reference SCS included in the uplink-downlink TDD configuration; and then the UL slot quantity corresponding to the period time of the first TDD pattern is determined based on the adjusted reference UL slot quantity and the adjusted reference UL symbol quantity. A calculation manner is performed based on the manner of calculating the UL slot quantity corresponding to the first TDD pattern in the foregoing embodiment. Details are not described herein again.

In some embodiments, a UL slot quantity corresponding to period time of a related TDD pattern is determined based on the reference SCS for SL transmission and the reference SCS in the uplink-downlink TDD configuration, instead of directly sending reference data such as a reference UL slot quantity in the uplink-downlink TDD configuration to the second terminal device. This is more flexibly applicable to SL communication between the terminal devices.

In some embodiments, the indication information is further used to indicate the first periodicity information.

In some embodiments, the first periodicity information further includes a TDD pattern quantity, and the TDD pattern quantity is 2; and the indication information includes a second bit sequence, a first part of bits in the second bit sequence are used to indicate the TDD pattern quantity, and a second part of bits in the second bit sequence are used to indicate the period time of the first TDD pattern and the period time of the second TDD pattern.

In some embodiments, the indication information is carried in a PSBCH payload (payload) of a sidelink synchronization signal block S-SSB. During implementation, the indication information is carried by using a part of bits of the PSBCH payload. For example, the indication information is carried by using W bits of the PSBCH payload, where W is an integer greater than or equal to 0. Further, optionally, W is 12.

Optionally, the first bit sequence is implemented by using a bit sequence of Z bits in the W bits, to indicate the UL transmission time corresponding to the first periodicity information. For example, in response to the first periodicity information including period time of one TDD pattern, a UL slot quantity corresponding to the period time of the TDD pattern is indicated by using the bit sequence of the Z bits; or in response to the first periodicity information including period time of two TDD patterns (the first TDD pattern and the second TDD pattern), the UL slot quantity corresponding to the period time of the first TDD pattern and the UL slot quantity corresponding to the period time of the second TDD pattern are jointly indicated by using the bit sequence of the Z bits. Z is an integer greater than or equal to 0 and less than or equal to W. Further, optionally, Z is 7.

The second bit sequence is implemented by using a bit sequence of (W-Z) bits other than the Z bits in the W bits, to indicate the first periodicity information. For example, in response to the first periodicity information including period time of one TDD pattern, a binary value "0" is represented by using 1 bit in the W-Z bits, to indicate that the first periodicity information includes one TDD pattern, namely, the first TDD pattern; and the period time of the first TDD pattern is indicated by using a remaining bit in the W-Z bits. For another example, in response to the first periodicity information including the period time of the first TDD pattern and the period time of the second TDD pattern, a binary value "1" is represented by using 1 bit in the W-Z bits, to indicate that the first periodicity information includes two TDD patterns, namely, the first TDD pattern and the second TDD pattern; and a period combination including the period time of the first TDD pattern and the period time of the second TDD pattern is indicated by using a remaining bit in the W-Z bits.

Figure 10:
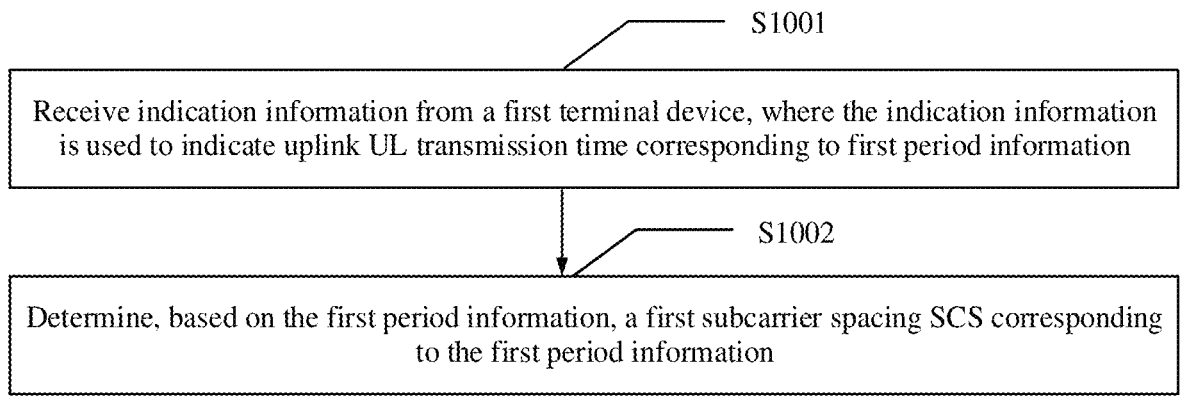
FIG. 10 is a schematic flowchart of another configuration information indication method in accordance with some embodiments.

Further, with reference to FIG. 10, an embodiment provides a configuration information indication method. The method is applied to a second terminal device and includes the following steps:

Step S1001: Receive indication information from a first terminal device, where the indication information is used to indicate uplink UL transmission time corresponding to first periodicity information.

Step S1002: Determine, based on the indication information, the UL transmission time corresponding to the first periodicity information.

In some embodiments, the second terminal device receives the indication information from the first terminal device, and determines the UL transmission time that corresponds to the first periodicity information and that is indicated by the indication information. The second terminal device performs SL transmission with another terminal device based on the UL transmission time corresponding to the first periodicity information in period time corresponding to the first periodicity information, to prevent SL transmission performed between the terminal devices from causing interference to DL transmission performed between a network device and the terminal device.

During implementation, the second terminal device directly receives the indication information sent by the first terminal device, or indirectly obtains, by using a forwarding mechanism of an intermediate device, the indication information sent by the first terminal device. In addition, the second terminal device is further used as an intermediate device to forward the received indication information to another terminal device.

In some embodiments, the first periodicity information is period information included in an uplink-downlink time division duplex TDD configuration received by the first terminal device, and the first periodicity information includes period time of a first TDD pattern and period time of a second TDD pattern.

In some embodiments, the UL transmission time corresponding to the first periodicity information includes a UL slot quantity corresponding to the period time of the first TDD pattern and a UL slot quantity corresponding to the period time of the second TDD pattern.

In some embodiments, the indication information includes a first bit sequence, and the first bit sequence is used to indicate the UL slot quantity corresponding to the period time of the first TDD pattern and the UL slot quantity corresponding to the period time of the second TDD pattern; and
  the determining, based on the indication information, the UL transmission time corresponding to the first periodicity information includes:
  determining, by parsing the first bit sequence, the UL slot quantity corresponding to the period time of the first TDD pattern and the UL slot quantity corresponding to the period time of the second TDD pattern.

In some embodiments, the first bit sequence is determined based on an indication parameter, where the indication parameter includes at least one of the following: the period time of the first TDD pattern, the period time of the second TDD pattern, the UL slot quantity corresponding to the period time of the first TDD pattern, the UL slot quantity corresponding to the period time of the second TDD pattern, and a first subcarrier spacing SCS corresponding to the first periodicity information, where the first SCS is used to indicate a sidelink SL reference SCS.

In some embodiments, the first bit sequence is determined based on an uplink slot indicator USI, and the first bit sequence is a binary representation of the USI; and the USI is determined according to the following function relationship formula:

$$USI = u_1 \times (P_2 \times 2^{\mu_{ref}^{SL}} + 1) + u_2, \text{ where}$$

$u_1$ represents the UL slot quantity corresponding to the period time of the first TDD pattern, $P_2$ represents the period time of the second TDD pattern, $u_2$ represents the UL slot quantity corresponding to the period time of the second TDD pattern, and $2^{\mu_{ref}^{SL}}$ is a coefficient determined based on the first SCS.

In some embodiments, the uplink slot indicator USI is determined by using the function relationship formula that represents a relationship between related parameters included in the indication parameter, and the first bit sequence is set to the binary representation of the USI, that is, the UL slot quantities corresponding to the period time of the two TDD patterns are jointly indicated. This is relatively flexible. Therefore, the second terminal device completely and accurately determines, by parsing the first bit sequence, the UL slot quantities corresponding to the period time of the two TDD patterns.

In some embodiments, the determining the UL slot quantity corresponding to the period time of the first TDD pattern and the UL slot quantity corresponding to the period time of the second TDD pattern includes:
  determining the first SCS and the period time of the second TDD pattern; and
  determining, based on the USI corresponding to the first bit sequence, the first SCS, and the period time of the second TDD pattern by using the function relationship formula, the UL slot quantity corresponding to the period time of the first TDD pattern and the UL slot quantity corresponding to the period time of the second TDD pattern.

In some embodiments, the indication information is further used to indicate the first periodicity information; and the determining the period time of the second TDD pattern includes: determining the period time of the second TDD pattern based on the indication information.

In some embodiments, the first periodicity information further includes a TDD pattern quantity, and the TDD pattern quantity is 2; and the indication information includes a second bit sequence, a first part of bits in the second bit sequence are used to indicate the TDD pattern quantity, and a second part of bits in the second bit sequence are used to indicate the period time of the first TDD pattern and the period time of the second TDD pattern; and
  the determining the period time of the second TDD pattern based on the indication information includes:
  determining the period time of the second TDD pattern based on the second part of bits in the second bit sequence.

In some embodiments, the indication information is indicated by using a limited quantity of bits of the first bit sequence and/or a limited quantity of bits of the second bit sequence, thereby facilitating parsing. Therefore, signaling overheads for communication between the terminal devices are reduced.

In some embodiments, the determining the first SCS includes: determining the first SCS based on a mapping relationship between the first periodicity information and the first SCS.

During implementation, the mapping relationship between the first periodicity information and the first SCS is configured through negotiation between terminal devices, for example, the first terminal device and the second terminal device.

In some embodiments, SL reference SCSs having mapping relationships with different period information are set for the different period information, for example, the first SCS is set for the first periodicity information. In period time corresponding to the different period information, the terminal device pertinently determines, based on the SL reference SCSs corresponding to the different period information, UL transmission time that is occupied to perform SL transmission, so that SL transmission between the terminal devices is more flexible.

In some embodiments, the determining the first SCS includes:
- determining a first set based on a second SCS and the period time of the first TDD pattern, where the first set is used to indicate a value range of the UL slot quantity corresponding to the period time of the first TDD pattern;
- determining a second set based on the second SCS and the period time of the second TDD pattern, where the second set is used to indicate a value range of the UL slot quantity corresponding to the period time of the second TDD pattern; and
- in response to determining that a quantity of elements included in a third set is less than or equal to a first threshold, determining the second SCS as the first SCS, where the third set is determined based on a direct product of the first set and the second set, and the first threshold is determined based on a quantity of bits of the first bit sequence.

In some embodiments, SL reference SCSs corresponding to different period information are configured based on consideration of a limited quantity of bits of the first bit sequence, namely, a limited quantity of values that are represented by the first bit sequence, to ensure that the first bit sequence indicates UL slot quantities of possible values corresponding to the different period information. The second terminal device that receives the indication information determines, based on the quantity of bits of the first bit sequence, an SL reference SCS corresponding to related period information, and then accurately determine occupiable UL transmission time in period time corresponding to the period information, to perform SL transmission. Therefore, interference to DL transmission is avoided.

In some embodiments, the indication information is carried in a PSBCH payload (payload) of a sidelink synchronization signal block S-SSB. During implementation, the indication information is carried by using a part of bits of the PSBCH payload. For example, the indication information is carried by using W bits of the PSBCH payload. The UL transmission time corresponding to the first periodicity information is indicated by using Z bits in the W bits, and the first periodicity information is indicated by using W-Z bits in the W bits. W is an integer greater than or equal to 0, and Z is an integer greater than or equal to 0 and less than or equal to W. Optionally, a value of W is 12, and a value of Z is 7.

Figure 11:
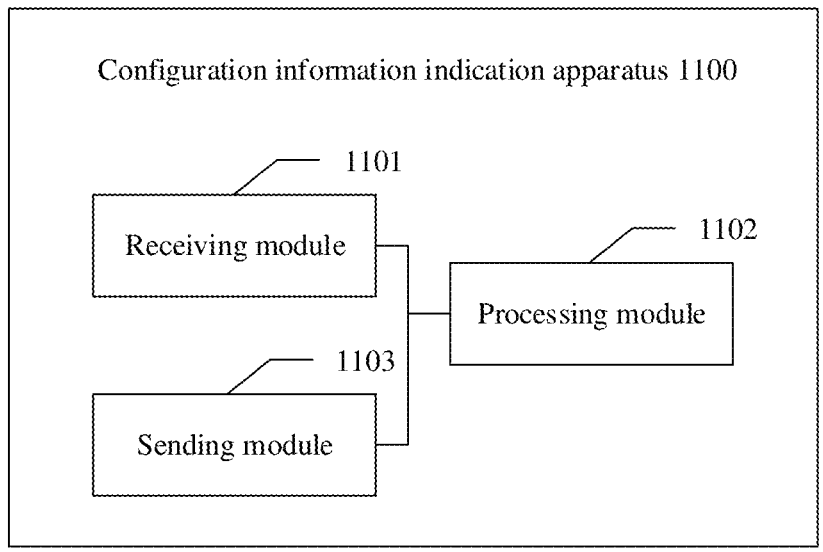
FIG. 11 is a schematic diagram of a structure of a configuration information indication apparatus in accordance with some embodiments.

Further, with reference to FIG. 11, an embodiment provides a configuration information indication apparatus 1100, including:
- a receiving module 1101, configured to receive an uplink-downlink time division duplex TDD configuration from a network device, where the uplink-downlink TDD configuration includes first periodicity information;
- a processing module 1102, configured to determine, based on the first periodicity information, a first subcarrier spacing SCS corresponding to the first periodicity information, where the first SCS is used to indicate a sidelink SL reference SCS; and
- a sending module 1103, configured to send indication information to a second terminal device based on the uplink-downlink TDD configuration and/or the first SCS, where the indication information is used to indicate uplink UL transmission time corresponding to the first periodicity information.

In some embodiments, a first terminal device determines corresponding SL reference SCSs for different period information, for example, determines the first SCS corresponding to the first periodicity information for the first periodicity information; and then pertinently indicates UL transmission time corresponding to period information included in the uplink-downlink TDD configuration to the second terminal device based on the SL reference SCSs corresponding to the different periods and the uplink-downlink TDD configuration, so that the second terminal device accurately performs SL transmission based on the indicated UL transmission time in period time corresponding to the period information, thereby avoiding interference to DL transmission.

In some embodiments, the first periodicity information includes period time of a first TDD pattern and period time of a second TDD pattern.

In some embodiments, the UL transmission time corresponding to the first periodicity information includes a UL slot quantity corresponding to the period time of the first TDD pattern and a UL slot quantity corresponding to the period time of the second TDD pattern.

In some embodiments, the indication information includes a first bit sequence, and the first bit sequence is used to indicate the UL slot quantity corresponding to the period time of the first TDD pattern and the UL slot quantity corresponding to the period time of the second TDD pattern; and the processing module is further configured to determine the first bit sequence based on an indication parameter, where the indication parameter includes at least one of the following: the period time of the first TDD pattern, the period time of the second TDD pattern, the UL slot quantity corresponding to the period time of the first TDD pattern, the UL slot quantity corresponding to the period time of the second TDD pattern, and the first SCS.

In some embodiments, the processing module 1102 is further configured to:
- determine an uplink slot indicator USI according to the following function relationship formula:

$$USI = u_1 \times (P_2 \times 2^{\mu_{ref}^{SL}} + 1) + u_2, \text{ where}$$

$u_1$ represents the UL slot quantity corresponding to the period time of the first TDD pattern, $P_2$ represents the period time of the second TDD pattern, $u_2$ represents the UL slot quantity corresponding to the period time of the second TDD pattern, and $2^{\mu_{ref}^{SL}}$ is a coefficient determined based on the first SCS; and
- determine the first bit sequence based on the USI, where the first bit sequence is a binary representation of the USI.

In some embodiments, the uplink slot indicator USI is determined by using the function relationship formula that represents a relationship between related parameters included in the indication parameter, and then the first bit sequence is determined based on the USI, to implement a joint indication of the UL slot quantities corresponding to the period time of the two TDD patterns, thereby ensuring that the UL slot quantities corresponding to the period time of the two TDD patterns are completely and accurately indicated by using a limited quantity of bits. This is relatively flexible.

In some embodiments, the processing module 1102 is further configured to determine, based on a mapping relationship between the first periodicity information and the first SCS, the first SCS corresponding to the first periodicity information.

In some embodiments, SL reference SCSs having mapping relationships with different period information are set for the different period information, for example, the first SCS is set for the first periodicity information. In period time corresponding to the different period information, the terminal device pertinently determines, based on the SL reference SCSs corresponding to the different period information, UL transmission time that is occupied to perform SL transmission, so that SL transmission between the terminal devices is more flexible.

In some embodiments, the processing module 1102 is further configured to:
  determine a first set based on a second SCS and the period time of the first TDD pattern, where the first set is used to indicate a value range of the UL slot quantity corresponding to the period time of the first TDD pattern;
  determine a second set based on the second SCS and the period time of the second TDD pattern, where the second set is used to indicate a value range of the UL slot quantity corresponding to the period time of the second TDD pattern; and
  in response to determining that a quantity of elements included in a third set is less than or equal to a first threshold, determine the second SCS as the first SCS, where the third set is determined based on a direct product of the first set and the second set, and the first threshold is determined based on a quantity of bits of the first bit sequence.

In some embodiments, SL reference SCSs corresponding to different period information are configured based on consideration of a limited quantity of bits of the first bit sequence, namely, a limited quantity of values that is represented by the first bit sequence, to ensure that the first bit sequence indicates UL slot quantities of possible values corresponding to the different period information, thereby ensuring that the terminal device that receives the indication information accurately determines occupiable UL transmission time in period time corresponding to the different period information, to perform SL transmission. Therefore, interference to DL transmission is avoided.

In some embodiments, the processing module 1102 is further configured to:
  determine, based on a ratio of the first SCS to a reference SCS included in the uplink-downlink TDD configuration, the UL slot quantity corresponding to the period time of the first TDD pattern and the UL slot quantity corresponding to the period time of the second TDD pattern.

In some embodiments, a UL slot quantity corresponding to period time of a related TDD pattern is determined based on the reference SCS for SL transmission and the reference SCS in the uplink-downlink TDD configuration, instead of directly sending reference data such as a reference UL slot quantity in the uplink-downlink TDD configuration to the second terminal device. This is more flexibly applicable to SL communication between the terminal devices.

In some embodiments, the indication information is further used to indicate the first periodicity information.

In some embodiments, the first periodicity information further includes a TDD pattern quantity, and the TDD pattern quantity is 2; and the indication information includes a second bit sequence, a first part of bits in the second bit sequence are used to indicate the TDD pattern quantity, and a second part of bits in the second bit sequence are used to indicate the period time of the first TDD pattern and the period time of the second TDD pattern.

In some embodiments, the indication information is carried in a physical sidelink broadcast channel PSBCH of a sidelink synchronization signal block S-SSB.

Figure 12:
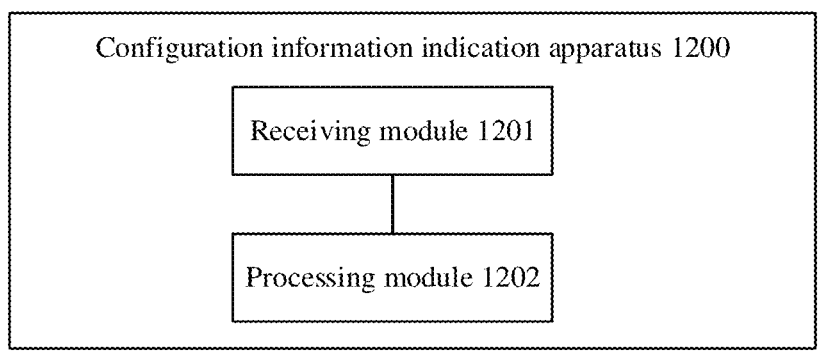
FIG. 12 is a schematic diagram of a structure of another configuration information indication apparatus in accordance with some embodiments.

Further, with reference to FIG. 12, an embodiment provides a configuration information indication apparatus 1200, including:
  a receiving module 1201, configured to receive indication information from a first terminal device, where the indication information is used to indicate uplink UL transmission time corresponding to first periodicity information; and
  a processing module 1202, configured to determine, based on the indication information, the UL transmission time corresponding to the first periodicity information.

In some embodiments, a second terminal device receives the indication information from the first terminal device, and determines the UL transmission time that corresponds to the first periodicity information and that is indicated by the indication information. The second terminal device performs SL transmission with another terminal device based on the UL transmission time corresponding to the first periodicity information in period time corresponding to the first periodicity information, to prevent SL transmission performed between the terminal devices from causing interference to DL transmission performed between a network device and the terminal device.

In some embodiments, the first periodicity information is period information included in an uplink-downlink time division duplex TDD configuration received by the first terminal device, and the first periodicity information includes period time of a first TDD pattern and period time of a second TDD pattern.

In some embodiments, the UL transmission time corresponding to the first periodicity information includes a UL slot quantity corresponding to the period time of the first TDD pattern and a UL slot quantity corresponding to the period time of the second TDD pattern.

In some embodiments, the indication information includes a first bit sequence, and the first bit sequence is used to indicate the UL slot quantity corresponding to the period time of the first TDD pattern and the UL slot quantity corresponding to the period time of the second TDD pattern; and
  the processing module 1202 is further configured to determine, by parsing the first bit sequence, the UL slot quantity corresponding to the period time of the first TDD pattern and the UL slot quantity corresponding to the period time of the second TDD pattern.

In some embodiments, the first bit sequence is determined based on an indication parameter, where the indication parameter includes at least one of the following: the period time of the first TDD pattern, the period time of the second TDD pattern, the UL slot quantity corresponding to the period time of the first TDD pattern, the UL slot quantity corresponding to the period time of the second TDD pattern, and a first subcarrier spacing SCS corresponding to the first periodicity information, where the first SCS is used to indicate a sidelink SL reference SCS.

In some embodiments, the first bit sequence is determined based on an uplink slot indicator USI, and the first bit sequence is a binary representation of the USI; and the USI is determined according to the following function relationship formula:

$$USI = u_1 \times (P_2 \times 2^{u_{ref}^{SL}} + 1) + u_2, \text{ where}$$

$u_1$ represents the UL slot quantity corresponding to the period time of the first TDD pattern, $P_2$ represents the period time of the second TDD pattern, $u_2$ represents the UL slot quantity corresponding to the period time of the second TDD pattern, and $2^{\mu_{ref}^{SL}}$ is a coefficient determined based on the first SCS.

In some embodiments, the uplink slot indicator USI is determined by using the function relationship formula that represents a relationship between related parameters included in the indication parameter, and the first bit sequence is set to the binary representation of the USI, that is, the UL slot quantities corresponding to the period time of the two TDD patterns are jointly indicated. This is relatively flexible. Therefore, the second terminal device accurately determines, by parsing the first bit sequence, the UL slot quantities corresponding to the period time of the two TDD patterns.

In some embodiments, the processing module 1202 is further configured to:
determine the first SCS and the period time of the second TDD pattern; and
determine, based on the USI corresponding to the first bit sequence, the first SCS, and the period time of the second TDD pattern by using the function relationship formula, the UL slot quantity corresponding to the period time of the first TDD pattern and the UL slot quantity corresponding to the period time of the second TDD pattern.

In some embodiments, the indication information is further used to indicate the first periodicity information; and the processing module 1202 is further configured to determine the period time of the second TDD pattern based on the indication information.

In some embodiments, the first periodicity information further includes a TDD pattern quantity, and the TDD pattern quantity is 2; and the indication information includes a second bit sequence, a first part of bits in the second bit sequence are used to indicate the TDD pattern quantity, and a second part of bits in the second bit sequence are used to indicate the period time of the first TDD pattern and the period time of the second TDD pattern; and
the processing module 1202 is further configured to determine the period time of the second TDD pattern based on the second part of bits in the second bit sequence.

In some embodiments, the indication information is indicated by using a limited quantity of bits of the first bit sequence and/or a limited quantity of bits of the second bit sequence, thereby facilitating parsing. Therefore, signaling overheads for communication between the terminal devices are reduced.

In some embodiments, the processing module 1202 is further configured to determine the first SCS based on a mapping relationship between the first periodicity information and the first SCS.

In some embodiments, SL reference SCSs having mapping relationships with different period information are set for the different period information, for example, the first SCS is set for the first periodicity information. In period time corresponding to the different period information, the terminal device pertinently determines, based on the SL reference SCSs corresponding to the different period information, UL transmission time that is occupied to perform SL transmission, so that SL transmission between the terminal devices is more flexible.

In some embodiments, the processing module is further configured to:
determine a first set based on a second SCS and the period time of the first TDD pattern, where the first set is used to indicate a value range of the UL slot quantity corresponding to the period time of the first TDD pattern;
determine a second set based on the second SCS and the period time of the second TDD pattern, where the second set is used to indicate a value range of the UL slot quantity corresponding to the period time of the second TDD pattern; and
in response to determining that a quantity of elements included in a third set is less than or equal to a first threshold, determining the second SCS as the first SCS, where the third set is determined based on a direct product of the first set and the second set, and the first threshold is determined based on a quantity of bits of the first bit sequence.

In some embodiments, SL reference SCSs corresponding to different period information are configured based on consideration of a limited quantity of bits of the first bit sequence, namely, a limited quantity of values that is represented by the first bit sequence, to ensure that the first bit sequence indicates UL slot quantities of possible values corresponding to the different period information. The second terminal device that receives the indication information determines, based on the quantity of bits of the first bit sequence, an SL reference SCS corresponding to related period information, and then accurately determine occupiable UL transmission time in period time corresponding to the period information, to perform SL transmission. Therefore, interference to DL transmission is avoided.

Figure 13:
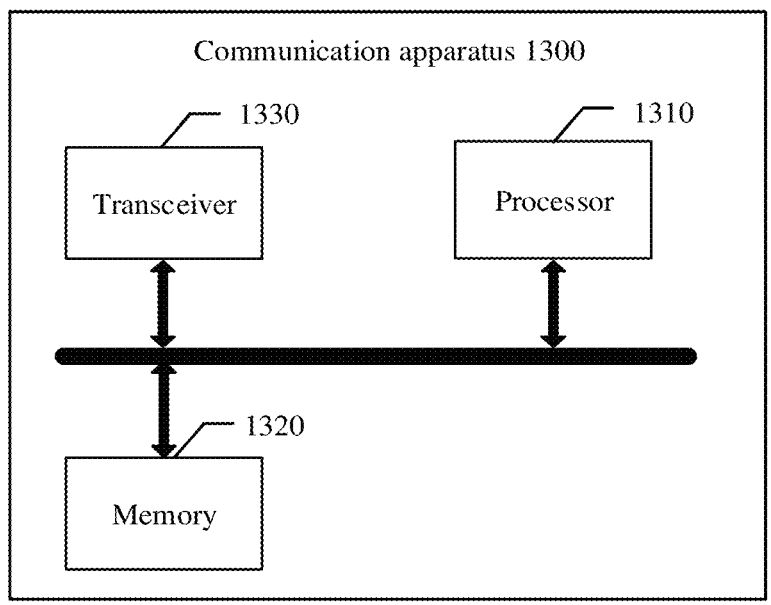
FIG. 13 is a schematic diagram of a structure of a communication apparatus in accordance with some embodiments.

Based on the same concept, as shown in FIG. 13, some embodiments provide a communication apparatus 1300. For example, the communication apparatus 1300 is a chip or a chip system. Optionally, in some embodiments, the chip system includes a chip, or includes the chip and another discrete component.

The communication apparatus 1300 includes at least one processor 1310, and the apparatus 1300 further includes at least one memory 1320, configured to store a computer program, program instructions, and/or data. The memory 1320 is coupled to the processor 1310. The coupling in this embodiment is an indirect coupling or a communication connection between apparatuses, units, or modules in an electrical form, a mechanical form, or another form, and is used for information exchange between the apparatuses, the units, or the modules. The processor 1310 performs a cooperative operation with the memory 1320. The processor 1310 executes the computer program stored in the memory 1320. Optionally, at least one of the at least one memory 1320 is included in the processor 1310.

The communication apparatus 1300 further includes a transceiver 1330. The communication apparatus 1300 exchanges information with another device by using the transceiver 1330. The transceiver 1330 is a circuit, a bus, a transceiver, or any other apparatus that is configured to perform information interaction.

In a possible implementation, the communication apparatus 1300 is applied to a first terminal device. The communication apparatus 1300 is the first terminal device, or is an apparatus that supports the first terminal device in implementing the function of the first terminal device in any one of the foregoing embodiments. The memory 1320 stores a computer program, program instructions, and/or data for implementing the function of the first terminal device in any one of the foregoing embodiments. The processor 1310 executes the computer program stored in the memory 1320, to complete the method performed by the first terminal device in any one of the foregoing embodiments.

In a possible implementation, the communication apparatus 1300 is applied to a second terminal device. The communication apparatus 1300 is the second terminal device, or is an apparatus that supports the second terminal device in implementing the function of the second terminal device in any one of the foregoing embodiments. The memory 1320 stores a computer program, program instructions, and/or data for implementing the function of the second terminal device in any one of the foregoing embodiments. The processor 1310 executes the computer program stored in the memory 1320, to complete the method performed by the second terminal device in any one of the foregoing embodiments.

In a possible implementation, the communication apparatus 1300 is applied to a network device. The communication apparatus 1300 is the network device, or is an apparatus that supports the network device in implementing the function of the network device in any one of the foregoing embodiments. The memory 1320 stores a computer program, program instructions, and/or data for implementing the function of the network device in any one of the foregoing embodiments. The processor 1310 executes the computer program stored in the memory 1320, to complete the method performed by the network device in any one of the foregoing embodiments.

In some embodiments, a connection medium between the transceiver 1330, the processor 1310, and the memory 1320 is not limited. In some embodiments, the memory 1320, the processor 1310, and the transceiver 1330 are connected by using a bus in FIG. 13, and the bus is represented by using a bold line in FIG. 13. This is an example for description and imposes no limitation, and another manner of connection between components are alternatively used. The bus is classified into an address bus, a data bus, a control bus, and the like. For ease of representation, one thick line is used to represent the bus in FIG. 13, but this does not mean that there is one bus or one type of bus.

In some embodiments, the processor is a general-purpose processor, a digital signal processor, an application-specific integrated circuit, a field programmable gate array or another programmable logic device, a discrete gate or transistor logic device, or a discrete hardware component, and implements or performs the methods, steps, and logical block diagrams disclosed in the embodiments. The general-purpose processor is a microprocessor, any conventional processor, or the like. The steps in the methods disclosed with reference to embodiments is directly performed by a hardware processor, or is performed by a combination of hardware in the processor and a software module.

In some embodiments, the memory is a nonvolatile memory such as a hard disk drive (hard disk drive, HDD) or a solid state drive (solid-state drive, SSD), or is a volatile memory (volatile memory) such as a random access memory (random-access memory, RAM). The memory alternatively is any other medium that is configured to carry or store expected program code in an instruction form or a data structure form and that is accessed by a computer. This is not limited thereto. The memory in embodiments alternatively is a circuit or any other apparatus that implements a storage function, and is configured to store a computer program, program instructions, and/or data.

Figure 14:
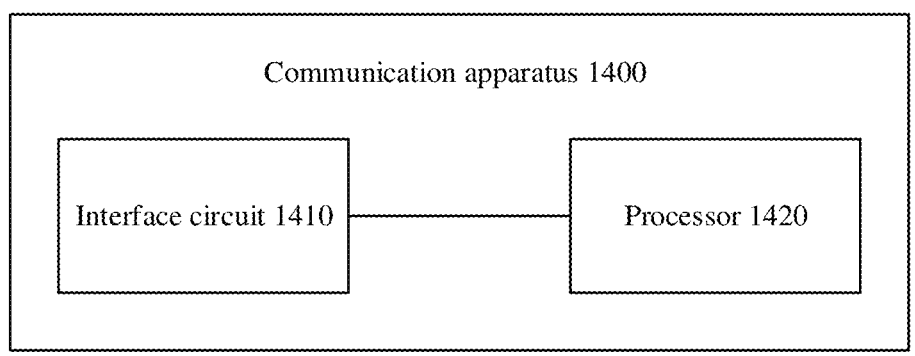
FIG. 14 is a schematic diagram of a structure of another communication apparatus in accordance with some embodiments.

Based on the foregoing embodiments, with reference to FIG. 14, an embodiment further provides another communication apparatus 1400, including an interface circuit 1410 and a processor 1420.

The interface circuit 1410 is configured to receive code instructions and transmit the code instructions to the processor.

The processor 1420 is configured to run the code instructions to perform the method performed by the first terminal device in any one of the foregoing embodiments or the method performed by the second terminal device in any one of the foregoing embodiments.

Based on the foregoing embodiments, an embodiment further provides a readable storage medium. The readable storage medium stores instructions. In response to the instructions being executed, the method performed by the first terminal device in any one of the foregoing embodiments or the method performed by the second terminal device in any one of the foregoing embodiments is implemented. The readable storage medium includes any medium that stores program code, such as a USB flash drive, a removable hard disk, a read-only memory, a random access memory, a magnetic disk, or an optical disc.

A person skilled in the art understands that embodiments is provided as a method, a system, or a computer program product. Therefore, the embodiments is configured to use a form of hardware embodiments, software embodiments, or embodiments with a combination of software and hardware. In addition, the embodiments is configured to use a form of a computer program product that is implemented on one or more computer-usable storage media (including but not limited to a disk memory, a CD-ROM, an optical memory, and the like) that include computer-usable program code.

The embodiments are described with reference to the flowcharts and/or block diagrams of the method, the device (system), and the computer program product according to the embodiments. In some embodiments, computer program instructions are used to implement each process and/or each block in the flowcharts and/or the block diagrams and a combination of a process and/or a block in the flowcharts and/or the block diagrams. These computer program instructions are provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions alternatively is stored in a computer-readable memory that indicates a computer or another programmable data processing device to work in a manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions alternatively is loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Clearly, a person skilled in the art is able to make various modifications and variations to embodiments without departing from the scope of the embodiments. In this way, the embodiments are intended to cover these modifications and variations of embodiments provided that these modifications and variations fall within the scope of protection described by the following claims and equivalent technologies.

What is claimed is:

1. A configuration information indication method, comprising:
   receiving an uplink-downlink time division duplex (TDD) configuration from a network device, wherein the uplink-downlink TDD configuration includes first periodicity information that includes period time of a first TDD pattern and period time of a second TDD pattern; and
   determining, based on the first periodicity information and a first subcarrier spacing (SCS), uplink (UL) transmission time corresponding to the first periodicity information, wherein the first SCS and the first periodicity information meet a first mapping relationship; the first mapping relationship is shown in the following table:

| Number | First period P(ms) | Second period P$_2$ (ms) | $\mu_{ref}^{SL}$ |
|---|---|---|---|
| 0 | 0.5 | 0.5 | 3 |
| 1 | 0.625 | 0.625 | 3 |
| 2 | 1 | 1 | 3 |
| 3 | 0.5 | 2 | 3 |
| 4 | 1.25 | 1.25 | 3 |
| 5 | 2 | 0.5 | 3 |
| 6 | 1 | 3 | 2 |
| 7 | 2 | 2 | 2 |
| 8 | 3 | 1 | 2 |
| 9 | 1 | 4 | 2 |
| 10 | 2 | 3 | 2 |
| 11 | 2.5 | 2.5 | 2 |
| 12 | 3 | 2 | 2 |
| 13 | 4 | 1 | 2 |
| 14 | 5 | 5 | 1 |
| 15 | 10 | 10 | 0 | the first period P is the period time of the first TDD pattern in a unit of ms, the second period P$_2$ is the period time of the second TDD pattern in the unit of ms, the number is an index of a period combination of the first period P and the second period P$_2$, and the first SCS is 15 KHz×$2^{\mu_{ref}^{SL}}$;

wherein: a UL slot quantity corresponding to the period time of the first TDD pattern is calculated according to a function relationship formula expressed as:

$$\mu_1 = \lfloor \mu_{slots} \cdot 2^{\mu_{ref}^{SL}}/2^{\mu_{ref}} \rfloor + \lfloor \mu_{sym} \cdot 2^{\mu_{ref}^{SL}}/2^{\mu_{ref}}/14 \rfloor,$$

wherein: $\mu_1$ represents the UL slot quantity corresponding to the period time of the first TDD pattern;
$\lfloor \; \rfloor$ represents rounding down; $\mu_{slots}$ represents a reference UL slot quantity that corresponds to the period time of the first TDD pattern and that is included in the uplink-downlink TDD configuration;
$\mu_{sym}$ represents a reference UL symbol quantity that corresponds to the period time of the first TDD pattern and that is included in the uplink-downlink TDD configuration; and
$2^{\mu_{ref}^{SL}}/2^{\mu_{ref}}$ is the ratio of the first SCS to a reference SCS included in the uplink-downlink TDD configuration; and a UL slot quantity corresponding to the period time of the second TDD pattern is calculated according to a function relationship formula expressed as:

$$\mu_2 = \lfloor \mu_{slots,2} \cdot 2^{\mu_{ref}^{SL}}/2^{\mu_{ref}} \rfloor + \lfloor \mu_{sym,2} \cdot 2^{\mu_{ref}^{SL}}/2^{\mu_{ref}}/14 \rfloor,$$

wherein: $\mu_2$ represents the UL slot quantity corresponding to the period time of the second TDD pattern;
$\lfloor \; \rfloor$ represents rounding down, $\mu_{slots2}$ represents a reference UL slot quantity that corresponds to a period information of the second TDD pattern and that is included in the uplink-downlink TDD configuration;
$\mu_{sym2}$ represents a reference UL symbol quantity that corresponds to the period information of the second TDD pattern and that is included in the uplink-downlink TDD configuration;
and $2^{\mu_{ref}^{SL}}/2^{\mu_{ref}}$ is the ratio of the first SCS to a reference SCS included in the uplink-downlink TDD configuration.

2. The method according to claim 1, wherein: the determining, based on the first periodicity information and the first SCS, the (UL) transmission time corresponding to the first periodicity information comprises: determining, based on the first periodicity information and a ratio of the first SCS to the reference SCS included in the uplink-downlink TDD configuration, the UL slot quantity corresponding to the period time of the first TDD pattern and the UL slot quantity corresponding to the period time of the second TDD pattern.

3. The method according to claim 1, further comprising: sending indication information to a second terminal device, wherein the indication information is configured to be used to indicate the uplink UL transmission time corresponding to the first periodicity information.

4. The method according to claim 3, wherein: the indication information includes a first bit sequence configured to be used to indicate a UL slot quantity corresponding to the period time of the first TDD pattern and a UL slot quantity corresponding to the period time of the second TDD pattern; and the method further comprising: determining the first bit sequence based on an indication parameter that includes at least one of the following: the period time of the first TDD pattern; the period time of the second TDD pattern; the UL slot quantity corresponding to the period time of the first TDD pattern; the UL slot quantity corresponding to the period time of the second TDD pattern; or the first SCS.

5. The method according to claim 4, wherein: the determining the first bit sequence based on the indication parameter comprises: determining an uplink slot indicator (USI) according to a function relationship formula expressed as:
USI=$u_1+u_2\times(P\times 2^{\mu_{ref}^{SL}}+1)$, wherein: $u_1$ represents the UL slot quantity corresponding to the period time of the first TDD pattern; $u_1$ is determined based on a reference UL slot quantity corresponding to the period time of the first TDD pattern; P represents the period time of the first TDD pattern; $u_2$ represents the UL slot quantity corresponding to the period time of the second TDD pattern; $u_2$ is determined based on a reference UL slot quantity corresponding to the period time of the second TDD SL pattern; and $2^{\mu_{ref}^{SL}}$ is a coefficient determined based on the first SCS; and determining the first bit sequence based on the USI, wherein the first bit sequence is a binary representation of the USI.

6. The method according to claim 3, wherein the indication information is further used to indicate the first periodicity information.

7. The method according to claim 6, wherein: the first periodicity information further includes a TDD pattern quantity, and the TDD pattern quantity is 2; and the indication information includes a second bit sequence, a first part of bits in the second bit sequence are used to indicate the TDD pattern quantity, and a second part of bits in the second bit sequence are used to indicate the period time of the first TDD pattern and the period time of the second TDD pattern.

8. The method according to claim 3, wherein the indication information is carried in a physical sidelink broadcast channel (PSBCH) of a sidelink synchronization signal block (S-SSB).

9. The method according to claim 1, wherein: the UL transmission time corresponding to the first periodicity information includes a UL slot quantity corresponding to the period time of the first TDD pattern and a UL slot quantity corresponding to the period time of the second TDD pattern.

10. A configuration information indication apparatus, comprises:
a receiving module, configured to receive an uplink-downlink time division duplex (TDD) configuration from a network device, wherein the uplink-downlink TDD configuration includes first periodicity information that includes period time of a first TDD pattern and period time of a second TDD pattern; and
a processing module, configured to determine, based on the first periodicity information and a first subcarrier spacing (SCS), uplink UL transmission time corresponding to the first periodicity information, wherein:
the first SCS and the first periodicity information meet a first mapping relationship;
the first mapping relationship is shown in the following table:

| Number | First period P(ms) | Second period $P_2$ (ms) | $\mu_{ref}^{SL}$ |
|---|---|---|---|
| 0 | 0.5 | 0.5 | 3 |
| 1 | 0.625 | 0.625 | 3 |
| 2 | 1 | 1 | 3 |
| 3 | 0.5 | 2 | 3 |
| 4 | 1.25 | 1.25 | 3 |
| 5 | 2 | 0.5 | 3 |
| 6 | 1 | 3 | 2 |
| 7 | 2 | 2 | 2 |
| 8 | 3 | 1 | 2 |
| 9 | 1 | 4 | 2 |
| 10 | 2 | 3 | 2 |
| 11 | 2.5 | 2.5 | 2 |
| 12 | 3 | 2 | 2 |
| 13 | 4 | 1 | 2 |
| 14 | 5 | 5 | 1 |
| 15 | 10 | 10 | 0 | the first period P is the period time of the first TDD pattern in a unit of ms, the second period $P_2$ is the period time of the second TDD pattern in the unit of ms, the number is an index of a period combination of the first period P and the second period SL $P_2$, and the first SCS is 15 KHz$\times 2^{\mu_{ref}^{SL}}$;
wherein: a UL slot quantity corresponding to the period time of the first TDD pattern is calculated according to a function relationship formula expressed as:

$$\mu_1 = \lfloor \mu_{slots} \cdot 2^{\mu_{ref}^{SL}}/2^{\mu_{ref}} \rfloor + \lfloor \mu_{sym} \cdot 2^{\mu_{ref}^{SL}}/2^{\mu_{ref}}/14 \rfloor,$$

wherein: $\mu_1$ represents the UL slot quantity corresponding to the period time of the first TDD pattern;
$\lfloor \ \rfloor$ represents rounding down; Uslots represents a reference UL slot quantity that corresponds to the period time of the first TDD pattern and that is included in the uplink-downlink TDD configuration;
$\mu_{sym}$ represents a reference UL symbol quantity that corresponds to the period time of the first TDD pattern and that is included in the uplink-downlink TDD configuration; and
$2^{\mu_{ref}^{SL}}/2^{\mu_{ref}}$ is the ratio of the first SCS to a reference SCS included in the uplink-downlink TDD configuration; and
a UL slot quantity corresponding to the period time of the second TDD pattern is calculated according to a function relationship formula expressed as:

$$\mu_2 = \lfloor \mu_{slots,2} \cdot 2^{\mu_{ref}^{SL}}/2^{\mu_{ref}} \rfloor + \lfloor \mu_{sym,2} \cdot 2^{\mu_{ref}^{SL}}/2^{\mu_{ref}}/14 \rfloor,$$

wherein: $\mu_2$ represents the UL slot quantity corresponding to the period time of the second TDD pattern;
$\lfloor \ \rfloor$ represents rounding down, $\mu_{slots2}$ represents a reference UL slot quantity that corresponds to a period information of the second TDD pattern and that is included in the uplink-downlink TDD configuration;
$\mu_{sym,2}$ represents a reference UL symbol quantity that corresponds to the period information of the second TDD pattern and that is included in the uplink-downlink TDD configuration;
and $2^{\mu_{ref}^{SL}}/2^{\mu_{ref}}$ is the ratio of the first SCS to a reference SCS included in the uplink-downlink TDD configuration.

11. The apparatus according to claim 10, wherein: the processing module is configured to determine, based on the first periodicity information and the first SCS, the uplink UL transmission time corresponding to the first periodicity information comprises:
the processing module is configured to determine, based on the first periodicity information and a ratio of the first SCS to the reference SCS included in the uplink-downlink TDD configuration, the UL slot quantity corresponding to the period time of the first TDD pattern and the UL slot quantity corresponding to the period time of the second TDD pattern.

12. The apparatus according to claim 10, further comprises: a sending module, configured to send indication information to a second terminal device, wherein the indication information is configured to be used to indicate the uplink UL transmission time corresponding to the first periodicity information.

13. The apparatus according to claim 12, wherein: the indication information includes a first bit sequence that is configured to be used to indicate a UL slot quantity corresponding to the period time of the first TDD pattern and a UL slot quantity corresponding to the period time of the second TDD pattern; and the processing module is further configured to determine the first bit sequence based on an indication parameter, wherein: the indication parameter includes at least one of the following: the period time of the first TDD pattern; the period time of the second TDD pattern; the UL slot quantity corresponding to the period time of the first TDD pattern; and the UL slot quantity corresponding to the period time of the second TDD pattern, or the first SCS.

14. The apparatus according to claim 13, wherein: the processing module is further configured to determine the first bit sequence based on the indication parameter comprises: the processing module is configured to determine an uplink slot indicator (USI) according to a function relationship formula expressed as:
USI=$\mu_1+\mu_2 \times (P \times 2^{\mu_{ref}^{SL}}+1)$, wherein: $u_1$ represents the UL slot quantity corresponding to the period time of the first TDD pattern; $u_1$ is determined based on a reference UL slot quantity corresponding to the period time of the first TDD pattern; P represents the period time of the first TDD pattern; $u_2$ represents the UL slot quantity corresponding to the period time of the second TDD pattern; $u_2$ is determined based on a reference UL slot quantity corresponding to the period time of the second TDD SL pattern; and $2^{\mu_{ref}SL}$ is a coefficient determined based on the first SCS; and the processing module is configured to determine the first bit sequence based on the USI, wherein the first bit sequence is a binary representation of the USI.

15. The apparatus according to claim 12, wherein the indication information is further used to indicate the first periodicity information.

16. The apparatus according to claim 15, wherein: the first periodicity information further includes a TDD pattern quantity, and the TDD pattern quantity is 2; and the indication information includes a second bit sequence, a first part of bits in the second bit sequence are used to indicate the TDD pattern quantity, and a second part of bits in the second bit sequence are used to indicate the period time of the first TDD pattern and the period time of the second TDD pattern.

17. The apparatus according to claim 12, wherein the indication information is carried in a physical sidelink broadcast channel PSBCH of a sidelink synchronization signal block S-SSB.

18. The apparatus according to claim 10, wherein: the UL transmission time corresponding to the first periodicity information includes a UL slot quantity corresponding to the period time of the first TDD pattern and a UL slot quantity corresponding to the period time of the second TDD pattern.

* * * * *